United States Patent
Kim

(10) Patent No.: US 9,219,908 B2
(45) Date of Patent: Dec. 22, 2015

(54) IMAGE DISPLAY APPARATUS AND METHOD FOR OPERATING THE SAME

(75) Inventor: Seonghun Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 808 days.

(21) Appl. No.: 13/217,068

(22) Filed: Aug. 24, 2011

(65) Prior Publication Data

US 2012/0050280 A1    Mar. 1, 2012

(30) Foreign Application Priority Data

Aug. 26, 2010    (KR) .................. 10-2010-0083119

(51) Int. Cl.
| | | |
|---|---|---|
| H04N 13/00 | (2006.01) | |
| H04N 13/04 | (2006.01) | |
| G09G 3/00 | (2006.01) | |
| G09G 3/36 | (2006.01) | |

(52) U.S. Cl.
CPC ........... H04N 13/0438 (2013.01); G09G 3/003 (2013.01); G09G 3/3648 (2013.01); H04N 13/0454 (2013.01); G09G 2320/0209 (2013.01); G09G 2320/0252 (2013.01); G09G 2320/0285 (2013.01); G09G 2320/041 (2013.01); G09G 2340/16 (2013.01)

(58) Field of Classification Search
USPC ................... 348/42–60; 345/87, 89
See application file for complete search history.

(56) References Cited

U.S. PATENT DOCUMENTS

| | | | | |
|---|---|---|---|---|
| 4,030,119 | A * | 6/1977 | Ellis ................................ | 378/4 |
| 6,061,043 | A * | 5/2000 | Bonnett et al. ................. | 345/89 |
| 8,411,136 | B2 * | 4/2013 | Ito ................................... | 348/51 |
| 2002/0186230 | A1 * | 12/2002 | Kudo et al. .................... | 345/690 |
| 2003/0231158 | A1 * | 12/2003 | Someya et al. ............... | 345/101 |
| 2004/0027322 | A1 * | 2/2004 | Chen et al. ....................... | 345/89 |
| 2004/0196234 | A1 | 10/2004 | Shiomi et al. | |
| 2005/0062703 | A1 * | 3/2005 | Lee et al. ......................... | 345/89 |
| 2006/0050038 | A1 * | 3/2006 | Cheon et al. .................... | 345/89 |
| 2007/0171474 | A1 * | 7/2007 | Jou et al. ....................... | 358/3.01 |
| 2008/0013001 | A1 * | 1/2008 | Jang et al. ....................... | 349/15 |
| 2009/0009508 | A1 * | 1/2009 | Koo et al. ...................... | 345/214 |
| 2009/0244270 | A1 * | 10/2009 | Takagi et al. ................... | 348/58 |
| 2009/0244387 | A1 * | 10/2009 | Lee et al. ....................... | 348/674 |
| 2010/0157024 | A1 * | 6/2010 | Park et al. ........................ | 348/51 |
| 2010/0245400 | A1 * | 9/2010 | Nakahata et al. ............. | 345/690 |

(Continued)

FOREIGN PATENT DOCUMENTS

| | | |
|---|---|---|
| CN | 1542715 A | 11/2004 |
| CN | 1603902 A | 4/2005 |

(Continued)

OTHER PUBLICATIONS

Gamma Correction (n.d.). In Wikipedia. Retrieved Sep. 30, 2004, from http://web.archive.org/web/20090130031020/http://en.wikipedia.org/wiki/Gamma_correction.*

*Primary Examiner* — Dave Czekaj
*Assistant Examiner* — Shanika Brumfield
(74) *Attorney, Agent, or Firm* — Birch, Stewart, Kolasch & Birch, LLP

(57) ABSTRACT

An image display apparatus and a method for operating the same are discussed. The method according to an embodiment includes determining whether an input image is a two-dimensional image or a three-dimensional image, changing a gray level of a current frame of the input image based on the determination result and based on a difference between the gray level of the current frame and a gray level of a previous frame of the input image, and displaying on a display unit an image corresponding to the current frame at the changed gray level.

20 Claims, 20 Drawing Sheets

(56) References Cited

U.S. PATENT DOCUMENTS

2011/0222559 A1 9/2011 Ishii et al.
2011/0279659 A1* 11/2011 Jung ............................... 348/54
2014/0049541 A1 2/2014 Park et al.

FOREIGN PATENT DOCUMENTS

| | | | |
|---|---|---|---|
| CN | 1953563 A | 4/2007 | |
| CN | 101010965 A | 8/2007 | |
| CN | 101115202 A | 1/2008 | |
| CN | 101763841 A | 6/2010 | |
| EP | 855832 A1 * | 7/1998 | ............ H04N 1/60 |
| EP | 2202720 A1 | 6/2010 | |
| EP | 2202993 A1 | 6/2010 | |
| EP | 2202993 A1 * | 6/2010 | ............ H04N 13/00 |
| WO | WO 2010/064557 A1 | 6/2010 | |

* cited by examiner (a)

PREVIOUS FRAME

| CURRENT FRAME | 0 | 64 | 128 | 192 | 256 | 320 | 384 | 448 | 512 |
|---|---|---|---|---|---|---|---|---|---|
| 0 | 0 | 0 | 0 | 0 | 0 | 0 | 0 | 0 | 0 |
| 64 | 178 | 64 | 0 | 0 | 0 | 0 | 0 | 0 | 0 |
| 128 | 235 | 210 | 128 | 0 | 0 | 0 | 0 | 0 | 0 |
| 192 | 368 | 318 | 275 | 192 | 120 | 60 | 0 | 0 | 0 |
| 256 | 500 | 455 | 410 | 340 | 256 | 180 | 115 | 60 | 0 |
| 320 | 615 | 575 | 535 | 464 | 393 | 320 | 240 | 180 | 140 |
| 384 | 730 | 695 | 660 | 595 | 530 | 586 | 384 | 295 | 230 |
| 448 | 815 | 785 | 755 | 699 | 643 | 586 | 530 | 448 | 375 |
| 512 | 900 | 875 | 850 | 803 | 755 | 705 | 655 | 585 | 512 |

(b)

PREVIOUS FRAME

| CURRENT FRAME | 0 | 64 | 128 | 192 | 256 | 320 | 384 | 448 | 512 |
|---|---|---|---|---|---|---|---|---|---|
| 0 | 0 | 0 | 0 | 0 | 0 | 0 | 0 | 0 | 0 |
| 64 | 186 | 64 | 0 | 0 | 0 | 0 | 0 | 0 | 0 |
| 128 | 145 | 216 | 128 | 0 | 0 | 0 | 0 | 0 | 0 |
| 192 | 376 | 326 | 281 | 192 | 115 | 52 | 0 | 0 | 0 |
| 256 | 510 | 465 | 418 | 346 | 256 | 175 | 107 | 50 | 0 |
| 320 | 625 | 585 | 545 | 472 | 399 | 320 | 235 | 173 | 130 |
| 384 | 742 | 705 | 669 | 604 | 563 | 456 | 384 | 290 | 222 |
| 448 | 828 | 798 | 772 | 712 | 654 | 593 | 536 | 448 | 360 |
| 512 | 915 | 887 | 863 | 814 | 765 | 713 | 663 | 591 | 512 |

(a)

(b)

(a)

LIQUID CRYSTAL RESPONSE TIME (b)

LIQUID CRYSTAL RESPONSE TIME (a)

(b)

IMAGE DISPLAY APPARATUS AND METHOD FOR OPERATING THE SAME

CROSS-REFERENCE TO RELATED APPLICATION

This application claims the priority benefit of Korean Patent Application No. 10-2010-0083119, filed on Aug. 26, 2010 in the Korean Intellectual Property Office, the disclosure of which is incorporated herein by reference.

BACKGROUND OF THE INVENTION

1. Field of the Invention

The present invention relates to an image display apparatus and a method for operating the same, and more particularly, to an image display apparatus and a method for operating the same, which can decrease crosstalk.

2. Description of the Related Art

An image display apparatus has a function of displaying images to a user. The image display apparatus can display a broadcast program selected by the user on a display from among broadcast programs transmitted from broadcasting stations. The recent trend in broadcasting is a worldwide shift from analog broadcasting to digital broadcasting.

As digital audio and video signals are broadcast, digital broadcasting offers many advantages over analog broadcasting, such as robustness against noise, less data loss, ease of error correction, and the ability to provide high-definition images. Digital broadcasting also allows interactive viewer services.

In digital broadcasting, extensive research has recently been conducted on three-dimensional (3D) images. In addition, 3D stereoscopy has been used and commercialized in a variety of environments and technologies.

SUMMARY OF THE INVENTION

Therefore, the present invention has been made in view of the above and other limitations associated with the related art, and it is an object of the present invention to provide an image display apparatus and a method for operating the same, which can decrease crosstalk.

It is another object of the present invention to provide an image display apparatus and a method for operating the same, which can change the gray level of an input image according to whether the input image is a two-dimensional (2D) or three-dimensional (3D) image.

It is a further object of the present invention to provide an image display apparatus and a method for operating the same, which can change the gray level of an image according to temperature and/or season.

In accordance with an aspect of the present invention, the above and other objects can be accomplished by the provision of a method for operating an image display apparatus, including changing a gray level of a current frame of an input image according to a difference between the gray level of the current frame and a gray level of a previous frame of the input image, and displaying an image corresponding to the current frame at the changed gray level on a display. The gray level of the current frame is changed differently according to whether the input image is a two-dimensional image or a three-dimensional image.

In accordance with another aspect of the present invention, the above and other objects can be accomplished by the provision of a method for operating an image display apparatus, including sensing temperature or acquiring season information, changing a gray level of a current frame of an input image according to a difference between the gray level of the current frame and a gray level of a previous frame of the input image, and displaying an image corresponding to the current frame at the changed gray level on a display. The gray level of the current frame is changed differently according to the sensed temperature or the acquired season information.

In accordance with a further aspect of the present invention, there is provided an image display apparatus including a gray level controller to change a gray level of a current frame of an input image according to a difference between the gray level of the current frame and a gray level of a previous frame of the input image, and a display to display an image corresponding to the current frame at the changed gray level. The gray level controller changes the gray level of the current frame differently according to whether the input image is a two-dimensional image or a three-dimensional image.

In accordance with a further aspect of the present invention, there is provided a method for operating an image display apparatus including a display unit, comprising: determining whether an input image is a two-dimensional image or a three-dimensional image; changing, by the image display apparatus, a gray level of a current frame of the input image based on the determination result and based on a relation (e.g., difference) between the gray level of the current frame and a gray level of a previous frame of the input image; and displaying, on the display unit, an image corresponding to the current frame at the changed gray level.

In accordance with a further aspect of the present invention, there is provided a method for operating an image display apparatus including a display unit, comprising: obtaining at least one of temperature information and season information; changing, by the image display apparatus, a gray level of a current frame of an input image according to a relation (e.g., difference) between the gray level of the current frame and a gray level of a previous frame of the input image and according to the at least one of the temperature information and the season information; and displaying, on the display unit, an image corresponding to the current frame at the changed gray level.

In accordance with a further aspect of the present invention, there is provided a image display apparatus comprising: a controller configured to determine whether an input image is a two-dimensional image or a three-dimensional image; a gray level processor configured to change a gray level of a current frame of the input image based on the determination result and based on a relation (e.g., difference) between the gray level of the current frame and a gray level of a previous frame of the input image; and a display unit configured to display an image corresponding to the current frame at the changed gray level.

BRIEF DESCRIPTION OF THE DRAWINGS

The above and other objects, features and other advantages of the present invention will be more clearly understood from the following detailed description taken in conjunction with the accompanying drawings, in which:

Figure 10:
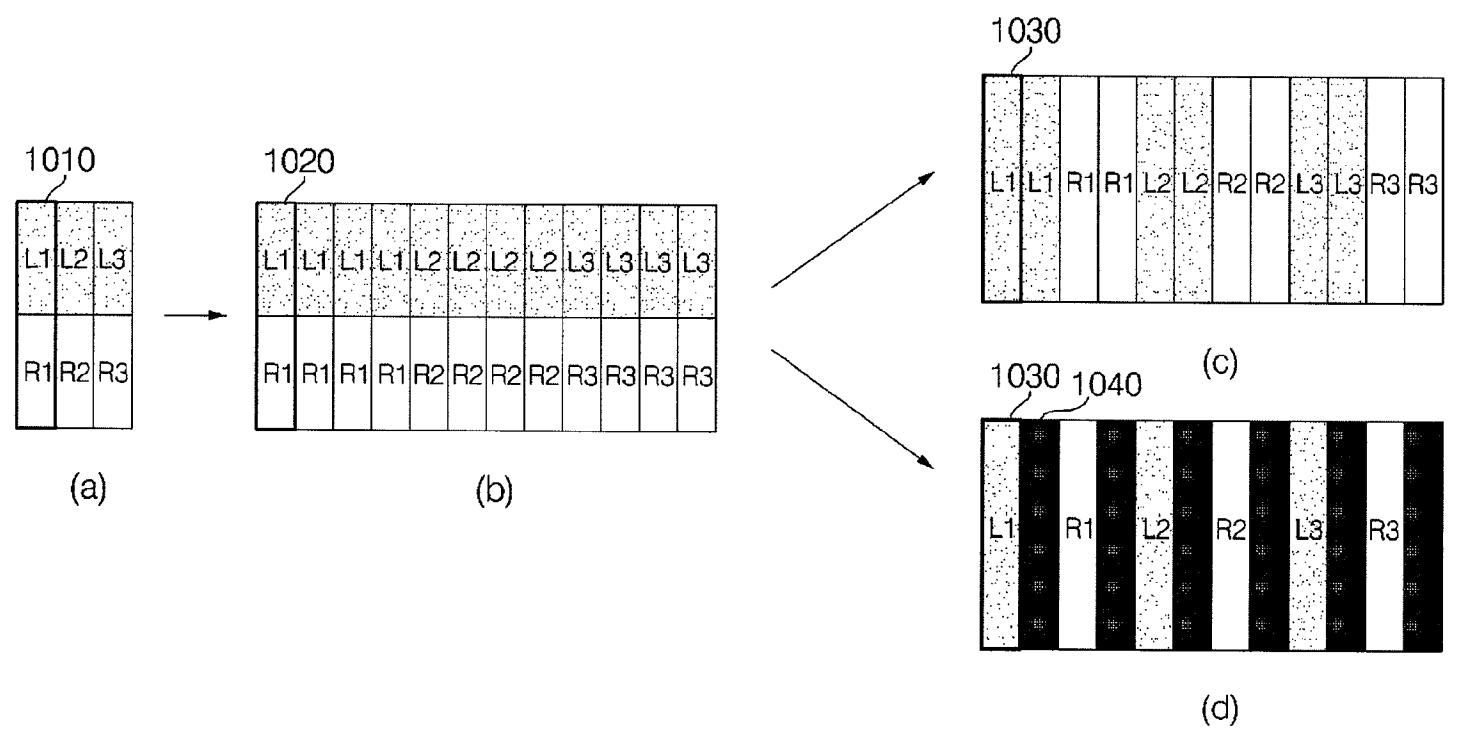

FIGS. 10(a) to 15(d) are views referred to for describing various examples of the method for operating an image display apparatus, illustrated in FIG. 9 according to an embodiment of the present invention;

FIGS. 17(a) to 20(b) are views referred to for describing various examples of the method for operating an image display apparatus, illustrated in FIG. 16 according to an embodiment of the present invention.

DETAILED DESCRIPTION OF THE PREFERRED EMBODIMENTS

Embodiments of the present invention will be described below with reference to the attached drawings.

The terms "module" and "unit" used to signify components are used herein to help the understanding of the components and thus they should not be considered as having specific meanings or roles. Accordingly, the terms "module" and "unit" may be used interchangeably.

Figure 1:
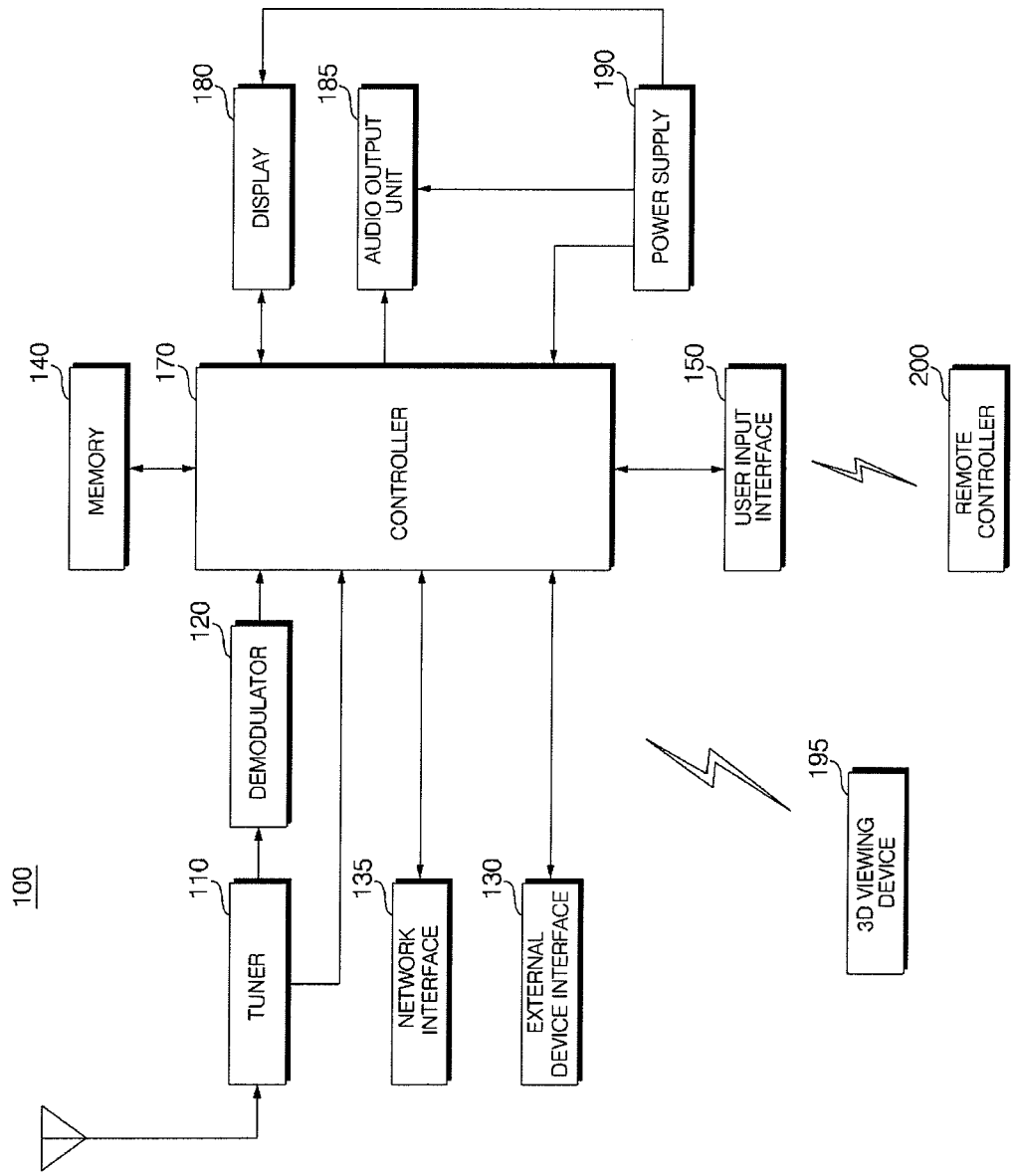
FIG. 1 is a block diagram of an image display apparatus according to an embodiment of the present invention.

FIG. 1 is a block diagram of an image display apparatus according to an embodiment of the present invention.

Referring to FIG. 1, an image display apparatus 100 according to an embodiment of the present invention includes a tuner 110, a demodulator 120, an external device interface 130, a memory 140, a network interface 135, a user input interface 150, a controller 170, a display 180, an audio output unit 185, a power supply 190, and a three-dimensional (3D) viewing device 195. All components of the image display apparatus 100 are operatively coupled and configured.

The tuner 110 selects a Radio Frequency (RF) broadcast signal corresponding to a channel selected by a user or a number of RF broadcast signals corresponding to all broadcast channels previously added to the image display apparatus 100 by a channel add function from among a plurality of RF broadcast signals received through an antenna, and downconverts the selected RF broadcast signal into a digital Intermediate Frequency (IF) signal or an analog baseband Audio/Video (A/V) signal.

More specifically, if the selected RF broadcast signal is a digital broadcast signal, the tuner 110 downconverts the selected RF broadcast signal into a digital IF signal, DIF. On the other hand, if the selected RF broadcast signal is an analog broadcast signal, the tuner 110 downconverts the selected RF broadcast signal into an analog baseband A/V signal, CVBS/SIF. For instance, the first tuner 120 may be a hybrid tuner capable of processing not only digital broadcast signals but also analog broadcast signals. The analog baseband A/V signal CVBS/SIF may be directly input to the controller 170.

The tuner 110 may be capable of receiving RF broadcast signals from an Advanced Television Systems Committee (ATSC) single-carrier system or from a Digital Video Broadcasting (DVB) multi-carrier system.

In addition, the tuner 110 may sequentially select a number of RF broadcast signals corresponding to all broadcast channels previously added to the image display apparatus 100 by the channel add function from among a plurality of RF signals received through the antenna, and may downconvert the selected RF broadcast signals into IF signals or baseband A/V signals. The tuner 110 can tune to one or more signals including broadcasting digital and/or analog signals.

The demodulator 120 receives the digital IF signal DIF from the tuner 110 and demodulates the digital IF signal DIF. For example, if the digital IF signal DIF is an ATSC signal, the demodulator 120 may perform 8-Vestigal SideBand (VSB) demodulation on the digital IF signal DIF. The demodulator 120 may also perform channel decoding. For channel decoding, the demodulator 120 may include a Trellis decoder (not shown), a de-interleaver (not shown) and a Reed-Solomon decoder (not shown) so as to perform Trellis decoding, de-interleaving and Reed-Solomon decoding.

For example, if the digital IF signal DIF is a DVB signal, the demodulator 120 performs Coded Orthogonal Frequency Division Multiple Access (COFDMA) demodulation on the digital IF signal DIF. The demodulator 120 may also perform channel decoding. For channel decoding, the demodulator 120 may include a convolution decoder (not shown), a de-interleaver (not shown), and a Reed-Solomon decoder (not shown) so as to perform convolution decoding, de-interleaving, and Reed-Solomon decoding.

The demodulator 120 may perform demodulation and channel decoding on the digital IF signal DIF received from the tuner 110, thereby obtaining a stream signal TS. The stream signal TS may be a signal in which one or more of a video signal, an audio signal and a data signal are multiplexed. For example, the stream signal TS 1 may be an MPEG-2 TS signal obtained by multiplexing an MPEG-2 video signal and a Dolby AC-3 audio signal. An MPEG-2 TS may include a 4-byte header and a 184-byte payload.

In order to properly handle not only ATSC signals but also DVB signals, the demodulator 120 may include an ATSC demodulator and a DVB demodulator. The demodulator 120 and tuner 110 are also configured to handle other types of signals known in the art.

The stream signal TS is input to the controller 170. The controller 170 may demultiplex the stream signal TS into a number of signals, process the demultiplexed signals, and output the processed signals as video data to the display 180 and as audio data to the audio output unit 185.

The external device interface 130 may connect an external device to the image display apparatus 100. For this purpose, the external device interface 130 may include an A/V Input/Output (I/O) unit and/or a wireless communication module.

The external device interface 130 is connected wirelessly or by cable or other means to an external device such as a smart phone, a Digital Versatile Disc (DVD) player, a Bluray player, a game console, a camera, a camcorder, or a computer (e.g., a laptop computer), etc. Then, the external device interface 130 externally receives video, audio, and/or data signals from the external device and transmits the received external input signals to the controller 170. In addition, the external device interface 130 may output video, audio, and data signals processed by the controller 170 to the external device.

In order to receive or transmit A/V signals from or to the external device, the A/V I/O unit of the external device interface 130 may include a Universal Serial Bus (USB) port, a Composite Video Banking Sync (CUBS) port, a Component port, a Super-video (S-video) (analog) port, a Digital Visual Interface (DVI) port, a High-Definition Multimedia Interface (HDMI) port, a Red-Green-Blue (RGB) port, a D-sub port, etc.

The wireless communication module of the external device interface 130 may conduct short-range communication with other electronic devices. For the short-range communication, the wireless communication module may be connected to other electronic devices over a network according to communication standards such as Bluetooth, Radio Frequency Identification (RFID), Infrared Data Association (IrDA), Ultra WideBand (UWB), Zigbee, etc.

The external device interface 130 may be connected to various set-top boxes through at least one of the afore-mentioned ports and may thus receive data from or transmit data to the various set-top boxes. The external device interface 130 may transmit data to or receive data from the 3D viewing device 195. The 3D viewing device 195 may include 3D eye glasses.

The network interface 135 interfaces between the image display apparatus 100 and a wired/wireless network such as the Internet. The network interface 135 may include an Ethernet port for connection to a wired network. For connection to wireless networks, the network interface 135 may operate in conformance with communication standards such as Wireless Local Area Network (WLAN) (i.e. Wi-Fi), Wireless Broadband (WiBro), World Interoperability for Microwave Access (WiMax), High Speed Downlink Packet Access (HS-DPA), etc.

The network interface 135 may receive content or data from the Internet, a content provider, or a network provider over a network. The received content or data may include content such as movies, advertisements, games, Video-on-Demand (VoD) files, and broadcast signals, and information related to the content. The network interface 135 may also receive update information and update files of firmware from a network operator. The network interface 135 may transmit data to the Internet, the content provider, or the network provider.

The network interface 135 may be connected to, for example, an Internet Protocol (IP) TV. To enable interactive communication, the network interface 135 may provide video, audio and/or data signals received from an IPTV set-top box to the controller 170 and provide signals processed by the controller 170 to the IPTV set-top box.

The term 'IPTV' as used herein covers a broad range of services, depending on transmission networks, such as Asynchronous Digital Subscriber Line-TV (ADSL-TV), Very high data rate Digital Subscriber Line-TV (VDSL-TV), Fiber To The Home-TV (HTTH-TV), TV over DSL, Video over DSL, TV over IP (TVIP), Broadband TV (BTV), Internet TV and full-browsing TV, which are capable of providing Internet access services.

The memory 140 may store various programs necessary for the controller 170 to process and control signals, and may also store processed video, audio and data signals. The memory 140 may temporarily store a video, audio or data signal received from the external device interface 130. The memory 140 may store information about broadcast channels identified through the channel add function, such as a channel map.

The memory 140 may include, for example, at least one of a flash memory-type storage medium, a hard disk-type storage medium, a multimedia card micro-type storage medium, a card-type memory, a Random Access Memory (RAM), or a Read-Only Memory (ROM) such as an Electrically Erasable Programmable ROM (EEPROM). The image display apparatus 100 may open a file (such as a video file, a still image file, a music file, or a text file) stored in the memory 140 for the user's manipulation and access.

While the memory 140 is shown in FIG. 1 as configured separately from the controller 170, to which the present invention is not limited, the memory 140 may be incorporated into the controller 170 or other part of the apparatus 100, for example.

The user input interface 150 transmits a signal received from the user to the controller 170 or transmits a signal received from the controller 170 to the user. For example, the user input interface 150 may receive various user input signals such as may receive various user input signals such as a power-on/off signal, a channel selection signal, and a screen setting signal from a remote controller 200 (or other devices such as a smart phone or laptop) or may transmit a signal received from the controller 170 to the remote controller 200 or the other devices, according to various communication schemes, for example, RF communication and IR communication.

For example, the user input interface 150 may provide the controller 170 with user input signals or control signals received from local keys, such as inputs of a power key, a channel key, and a volume key, and setting values.

Also, the user input interface 150 may transmit a user input signal received from a sensor unit that senses a user's gesture to the controller 170 or transmit a signal received from the controller 170 to the sensor unit. The sensor unit may include a touch sensor, a voice sensor, a position sensor, a motion sensor, etc. The user input interface 150 may include an input unit such as a keyboard, a touch-sensitive display (which can be part of the display 180), a keypad, etc.

The controller 170 may demultiplex the stream signal TS received from the tuner 110, the demodulator 120, or the external device interface 130 and process the demultiplexed signals so that the processed signals can be output as audio and video data.

The video signal processed by the controller 170 may be displayed as an image on the display 180. The video signal processed by the controller 170 may also be transmitted to an external output device through the external device interface 130. The audio signal processed by the controller 170 may be output as sound to the audio output unit 185. Also, the audio signal processed by the controller 170 may be transmitted to the external output device through the external device interface 130. Additional data, other than the audio and video data, obtained from the signals received by the tuner 110 and/or the memory 140, may also be processed by the controller 170 and can be displayed to the user. For instance, EPG (Electronic Program Guide) data may be displayed on the display 180 along with the broadcast programs.

While not shown in FIG. 1, the controller 170 may include a demultiplexer (DEMUX) and a video processor, which will be described later with reference to FIG. 4. In addition, the controller 170 may provide the overall control to the image display apparatus 100. For example, the controller 170 may control tuning of the tuner 110 to an RF broadcast corresponding to a user-selected channel or a pre-stored channel.

The controller 170 may control the image display apparatus 100 according to a user command received through the user input interface 150 or according to an internal program. For example, the controller 170 controls the tuner 110 to receive a channel selected according to a specific channel selection command received through the user input interface 150 and processes a video, audio and/or data signal of the selected channel. The controller 170 outputs the processed video or audio signal along with information about the user-selected channel to the display 180 or the audio output unit 185.

In another example, the controller 170 outputs a video or audio signal received from an external device such as a camera or a camcorder through the external device interface 130 to the display 180 or to the audio output unit 185 according to an external device video play command received through the external device interface 150.

The controller 170 may control display of images on the display 180. For instance, the controller 170 may control the display 180 to display a broadcast image received from the tuner 110, an external image received through the external device interface 130, an image received through the network interface 130, or an image stored in the memory 140.

The image displayed on the display 180 may be a two-dimensional (2D) or 3D still image or moving picture. The controller 170 controls a particular object in the image displayed on the display 180 to be rendered as a 3D object. For example, the particular object may be at least one of a linked Web page (e.g., from a newspaper, a magazine, etc.), an Electronic Program Guide (EPG), a menu, a widget, an icon, a still image, a moving picture, or text.

This 3D object may be processed to have a different depth from the image displayed on the display 180. Preferably, the 3D object may appear protruding relative to the image displayed on the display 180.

The controller 170 may locate the user based on an image captured by a camera unit associated with the apparatus 100. Specifically, the controller 170 may measure the distance (e.g., a z-axis coordinate) between the user and the image display apparatus 100. In addition, the controller 170 may calculate x-axis and y-axis coordinates corresponding to the position of the user on the display 180.

The image display apparatus 100 may further include a channel browsing processor for generating thumbnail images corresponding to channel signals or external input signals. The channel browsing processor may extract some of the video frames of each of stream signals TS received from the demodulator 120 or stream signals received from the external device interface 130 and display the extracted video frames on the display 180 as thumbnail images. The thumbnail images may be output to the controller 170 after they are encoded or without encoding. Also, it is possible to encode the thumbnail images into a stream and output the stream to the controller 170. The controller 170 may display a thumbnail list including a plurality of received thumbnail images on the display 180. The thumbnail list may be displayed on a part of the display 180 with an image displayed on the display 180, e.g., as a compact view, or the thumbnail list may be displayed in full screen on the display 180.

The display 180 generates drive signals by converting a processed video signal, a processed data signal, an On Screen Display (OSD) signal, and a control signal received from the controller 170 or a video signal, a data signal, and a control signal received from the external device interface 130.

The display 180 may be various types of displays such as a Plasma Display Panel (PDP), a Liquid Crystal Display (LCD), an Organic Light-Emitting Diode (OLED) display, and a flexible display. The display 180 is preferably capable of displaying 3D images according to an embodiment of the present invention.

For 3D visualization, the display 180 may be configured into an auto-stereoscopic 3D display (glasses-free) or a traditional stereoscopic 3D display (with glasses).

Auto-stereoscopy is any method of displaying 3D images without any additional display, for example, special glasses on the part of a user. Thus, the display 180 displays 3D images on its own. Renticular and parallax barrier are examples of auto-stereoscopic 3D imaging.

The traditional stereoscopy may need an additional display besides the display 180 in order to display 3D images. The additional display may be a Head Mount Display (HMD) type, a glasses type, etc. As special 3D glasses, polarized glasses operate in a passive manner, whereas shutter glasses operate in an active manner. Also, HMD types may be categorized into passive ones and active ones.

According to an embodiment of the present invention, the 3D viewing device 195 is used to allow the user to view 3D images. The 3D viewing device 195 may correspond to the above-described additional display. The following description will be made mainly in the context of the 3D viewing device 195 being shutter glasses.

The display 180 may also be a touch screen that can be used not only as an output device but also as an input device. The audio output unit 185 may receive a processed audio signal (e.g., a stereo signal, a 3.1-channel signal or a 5.1-channel signal) from the controller 170 and output the received audio signal as voice. The audio output unit 185 may include various types of speakers.

To sense a user's gesture, the image display apparatus 100 may further include the sensor unit that has at least one of a touch sensor, a voice sensor, a position sensor, or a motion sensor, as stated before. A signal sensed by the sensor unit may be output to the controller 170 through the user input interface 150.

The controller 170 may sense a user's gesture from an image captured by the camera unit or a signal sensed by the sensor unit, or by combining the captured image and the sensed signal.

The power supply 190 supplies power to the whole image display apparatus 100, particularly to the controller 170 that may be configured into a System On Chip (SOC), the display 180 for displaying images, and the audio output unit 185 for outputting audio data.

The remote controller 200 transmits a user input to the user input interface 150. For the transmission of the user input, the remote controller 200 may operate based on various communication standards such as Bluetooth, RF, IR, UWB and ZigBee. In addition, the remote controller 200 may receive a video signal, audio signal and/or data signal from the user input interface 150 and output the received signal as an image or sound.

The above-described image display apparatus 100 may be a fixed digital broadcast receiver capable of receiving at least one of ATSC (8-VSB) broadcast programs, DVB-T (COFDM) broadcast programs, and ISDB-T (BST-OFDM) broadcast programs. Alternatively, the image display apparatus 100 may be a mobile digital broadcast receiver capable of at least one of terrestrial DMB broadcast programs, satellite DMB broadcast programs, ATSC-M/H broadcast programs, DVB-H (COFDM) broadcast programs, and Media Forward Link Only (MediaFLO) broadcast programs, or a mobile digital broadcast receiver capable of receiving cable, satellite and/or IPTV broadcast programs.

The image display apparatus 100 as set forth herein may be any of a TV receiver, a mobile phone, a smart phone, a laptop computer, a digital broadcast terminal, a Personal Digital Assistant (PDA), a Portable Multimedia Player (PMP), a television (e.g., DTV), etc.

The block diagram of the image display apparatus 100 illustrated in FIG. 1 is an exemplary embodiment of the present invention. The image display apparatus 100 is shown in FIG. 1 as having a number of components in a given configuration. However, the image display apparatus 100 may include fewer components or more components than those shown in FIG. 1 in alternative embodiments. Also, two or more components of the image display apparatus 100 may be combined into a single component or a single component thereof may be separated into two or more components in alternative embodiments. The functions of the components of the image display apparatus 100 as set forth herein are illustrative in nature and may be modified, for example, to meet the requirements of a given application.

The following description is given with the appreciation that as a non-limiting example, the image display apparatus 100 is assumed to be capable of displaying 3D images and an LCD panel-based display with a backlight unit.

Figure 2:
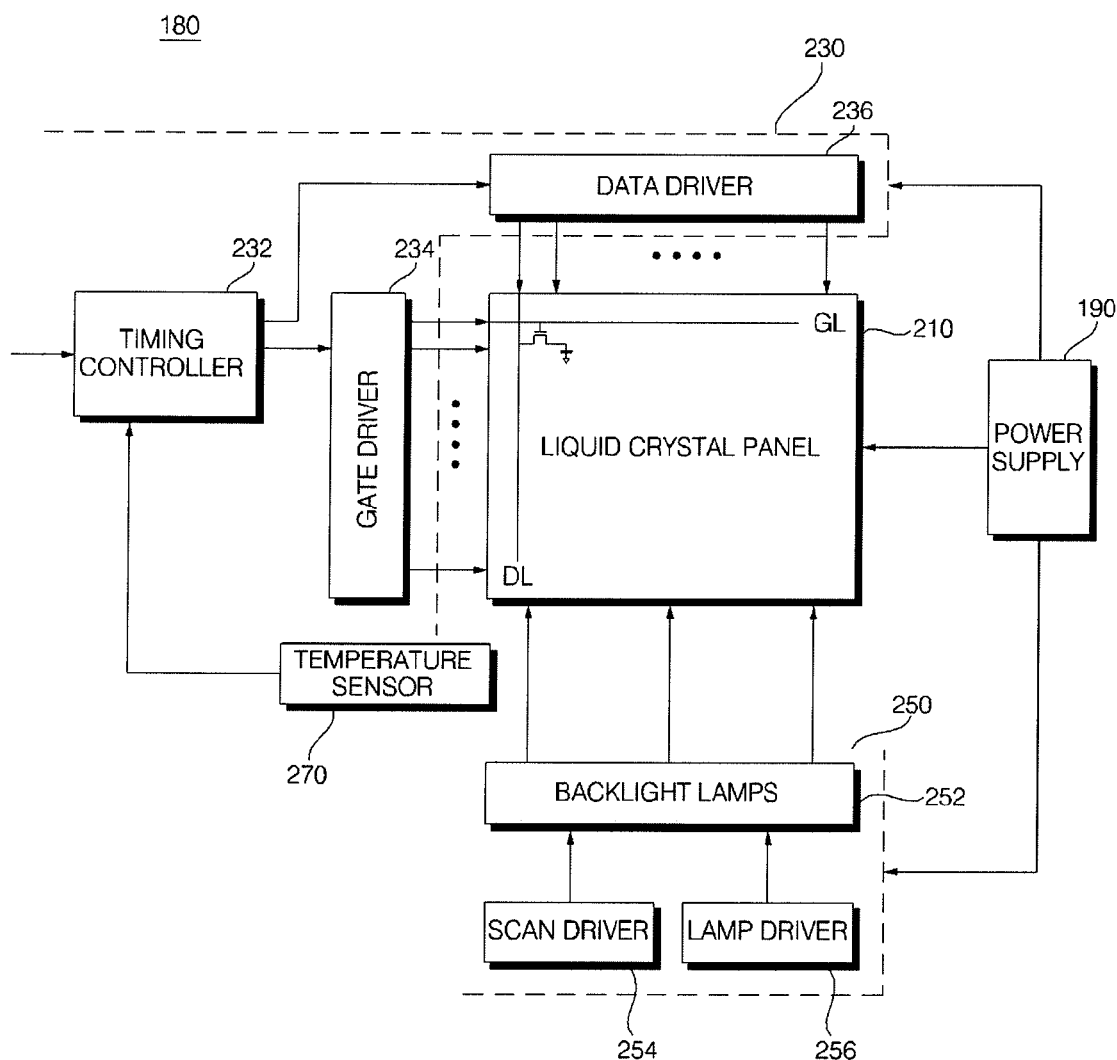
FIG. 2 is an exemplary block diagram of a power supply and a display illustrated in FIG. 1.

FIG. 2 is a block diagram of the power supply 190 and the display 180 illustrated in FIG. 1 according to an embodiment of the present invention.

Referring to FIG. 2, the LCD panel-based display 180 includes a liquid crystal panel 210, a driving circuit 230, a backlight unit 250, and a temperature sensor 270.

The liquid crystal panel 210 has a first substrate, a second substrate, and a liquid crystal layer between the first and second substrates. On the first substrate, a plurality of gate lines GL and a plurality of data lines DL form a matrix, intersecting each other, and thin-film transistors and pixel electrodes connected to the thin-film transistors are provided at the intersections. Common electrodes may be preferably provided on the second substrate.

The driving circuit 230 drives the liquid crystal panel 210 according to control signals and data signals received from the controller 170 illustrated in FIG. 1. To drive the liquid crystal panel 210, the driving circuit 230 includes a timing controller 232, a gate driver 234 for controlling the gate lines, and a data driver 236 for controlling the data lines.

The timing controller 232 receives a control signal, an RGB data signal, and a vertical synchronization signal Vsync from the controller 170, controls the gate driver 234 and the data driver 236 according to the control signal, re-arranges the RGB data signal, and provides the re-arranged RGB data signal to the data driver 236.

The timing controller 232 may include a gray level controller 300 for adjusting the gray level of a current frame of an input image according to the gray level difference between the current frame and a previous frame of the input image. For example, an RGB data signal of the current frame may be adjusted based on the gray level difference between the RGB data signals of the current frame and the previous frame, which will be described later with reference to FIG. 3.

The gate driver 234 and the data driver 236 provide a scan signal and a video signal to the liquid crystal panel 210 through the gate lines GL and the data lines DL under the control of the timing controller 232.

The backlight unit 250 illuminates the liquid crystal panel 210. Thus the backlight unit 250 may include a plurality of backlight lamps 252 as light sources, a scan driver 254 for controlling the scanning driving of the backlight lamps 252, and a lamp driver 256 for turning on or off the backlight lamps 252. As a variation, instead of the lamps, LEDs or other types of light emitting sources may be used as the light sources 252.

When the backlight lamps 252 are turned on, light is projected onto the back surface of the liquid crystal panel 210 by means of a diffuser sheet that diffuses incident light from the backlight lamps 252, a reflection sheet that reflects the light, and an optical sheet that polarizes, scatters, and diffuses the light. The backlight unit 250 preferably includes one or more light sources and one or more means (e.g., optical sheets, diffusers, etc.) to propagate the light from the light sources towards the liquid crystal panel 210.

The backlight lamps 252 may be arranged on the rear surface of the liquid crystal panel 210, especially on upper and lower sides of the rear surface of the liquid crystal panel 210. A display with this layout of backlight lamps is called an edge type. Compared to the edge type, the backlight lamps 252 may be arranged uniformly across the rear surface of the liquid crystal panel 210. A display with this backlight layout is called a direct type.

The backlight lamps 252 may be turned on simultaneously or sequentially on a block basis. The backlight lamps 252 may be Light Emitting Diodes (LEDs).

An image is displayed by the light emitted from the backlight unit 250, with the light transmittance of the liquid crystal layer controlled using the electrical field between the pixel electrodes and the common electrodes of the liquid crystal panel 210.

The power supply 190 may supply a common electrode voltage $V_{com}$ to the liquid crystal panel 210 and a gamma voltage to the data driver 236. In addition, the power supply 190 supplies a driving voltage to the backlight unit 250 in order to drive the backlight lamps 252.

The temperature sensor 270 senses the inner or ambient temperature of the image display apparatus 100, especially the ambient temperature of or around the liquid crystal panel 210. Because the response speed of liquid crystals in the liquid crystal panel 210 varies with temperature, temperature may be sensed for use in controlling the gray level of an image. For this purpose, information indicating the sensed temperature may be provided to the gray level controller 300 of the timing controller 232 or to the controller 170.

To sense the temperature of the liquid crystal panel 210 (e.g., ambient temperature surrounding the panel 210), a thermistor whose resistance varies with temperature may be used. A Negative Temperature Coefficient (NTC) thermistor is one in which resistance decreases with an increase in temperature, whereas a Positive Temperature Coefficient (PTC) thermistor is one in which resistance increases with an increase in temperature.

For example, a variation in voltage with respect to a change in the temperature of the liquid crystal panel 210 may be sensed using a thermistor in a bias voltage generator that generates a turn-on voltage $V_{gh}$ for the gate end of the gate driver 234.

Figure 3:
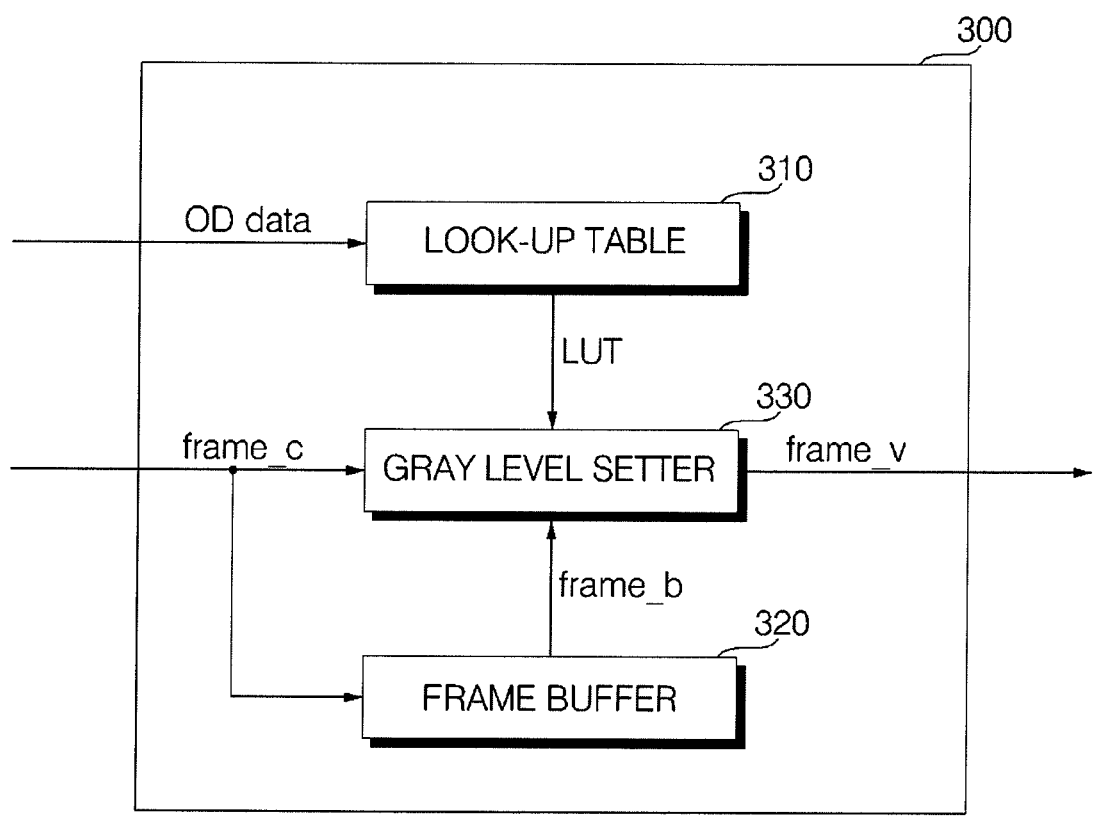
FIG. 3 illustrates a block diagram of a gray level controller according to an embodiment of the present invention.

FIG. 3 is a block diagram of the gray level controller 300 of the image display apparatus 100 according to an embodiment of the present invention.

Referring to FIG. 3, the gray level controller 300 according to the embodiment of the present invention may be located inside the timing controller 232, which should not be construed as limiting the present invention. The gray level controller 300 may be placed at the frontal end of the timing controller 232. The following description will be given on the assumption that the gray level controller 300 resides in the timing controller 232.

The gray level controller 300 controls the gray level of an input image. To control the gray level, the gray level controller 300 includes a look-up table 310, a frame buffer 320, and a gray level setter 330.

The look-up table 310 tabulates gray level data (i.e. overdriving (OD) data) which is set based on the gray levels of current and previous frames of an input image. For example, if the current and previous frames of the input image each have an identical gray level, the same gray level may be set. If the gray level of the current frame is greater than the gray level of the previous frame, a higher gray level than the gray level of the current frame may be set. Gray level control will be described later with reference to FIG. 12.

Meanwhile, the controller 170 or the memory 140 may provide the OD data to the look-up table 310 of the gray level controller 300. For instance, if an input image is a 3D image, the controller 170 or the memory 140 may provide OD data for the 3D image to the look-up table 310 of the gray level controller 300. Thus, gray levels listed in the look-up table 310 may be changed according to the OD data for the 3D image. The OD data vary depending on whether the image is a 2D image or a 3D image.

If the input image is a 2D image, the controller 170 or the memory 140 may provide OD data for the 2D image to the look-up table 310 of the gray level controller 300. Thus, gray levels listed in the look-up table 310 may be changed according to the OD data for the 2D image. In addition, the controller 170 or the memory 140 may provide OD data corresponding to a temperature (e.g., ambient temperature) sensed by the temperature sensor 270 or season information to the look-up table 310 of the gray level controller 300. Therefore, the look-up table 310 may be changed accordingly.

The gray level setter 330 may set a gray level, referring to gray level data LUT of the look-up table 310.

The frame buffer 320 buffers a current frame frame_c received from the controller 170 and a previous frame frame_b. The frame buffer 320 provides the previous frame frame_b to the gray level setter 330. If the input image is a 3D image, the frame buffer 320 may buffer left-eye and right-eye images arranged by the formatter 460 of the controller 170 (FIG. 4).

The gray level setter 330 may change the gray level of the current frame frame_c using the current frame frame_c, the previous frame frame_b, and the gray level data LUT of the look-up table 310.

The gray level setter 330 may change the gray level of the current frame frame_c differently according to whether the current frame frame_c is for a 2D or 3D image. For example, if the current frame frame_c is of a 3D image, the gray level of the current frame frame_c may be changed more than the gray level of a 2D image.

In an example, if the gray levels of the previous and current frames of an input image signal are 64 and 256, respectively, the gray level of the current frame may be adjusted to 455 in the case of a 2D image or to 465 in the case of a 3D image. The gray level adjustment for the current frame may be larger for the 3D image than for the 2D image. Since the gray level of the 3D image is adjusted to increase more than that for a 2D image, the resulting overdriving may prevent crosstalk which is caused by separate display of left-eye and right-eye images, particularly by an increased frame rate. The present invention, in operation, compensates for the different types of image, e.g., 3D or 2D images.

In another example, if the gray levels of the previous and current frames of an input image are 448 and 256, respectively, the gray level of the current frame may be adjusted to 60 in case the input image is a 2D image or to 50 in case the input image is a 3D image. Since a 3D image experiences a greater gray level change than a 2D image, the resulting overdriving according to the present invention may prevent crosstalk encountered with the 3D imaging.

Meanwhile, the gray level setter 330 may control the gray level of the current frame frame_c according to the frame rate of the current frame frame_c. For example, as the frame rate of the input current frame frame_c increases, the gray level of the current frame frame_c may be adjusted by the gray level controller 300 more.

Further, the gray level setter 330 may change the gray level of the current frame frame_c according to the inner temperature or ambient temperature of the image display apparatus 100. For instance, the gray level variation of the current frame frame_c may increase with a lower temperature detected (e.g., lower ambient temperature surrounding the image display apparatus 100). In addition or in the alternative, the gray level setter 330 may differentiate the gray level of the current frame frame_c according to seasons. For example, the gray level variation of the current frame frame_c may be greater in the winter time than in the summer time.

The gray level-controlled current frame frame_v may be re-arranged in the timing controller 232. Specifically, the RGB data signal of the gray level-controlled current frame frame_v may be rearranged and provided to the data driver 236.

Figure 4:
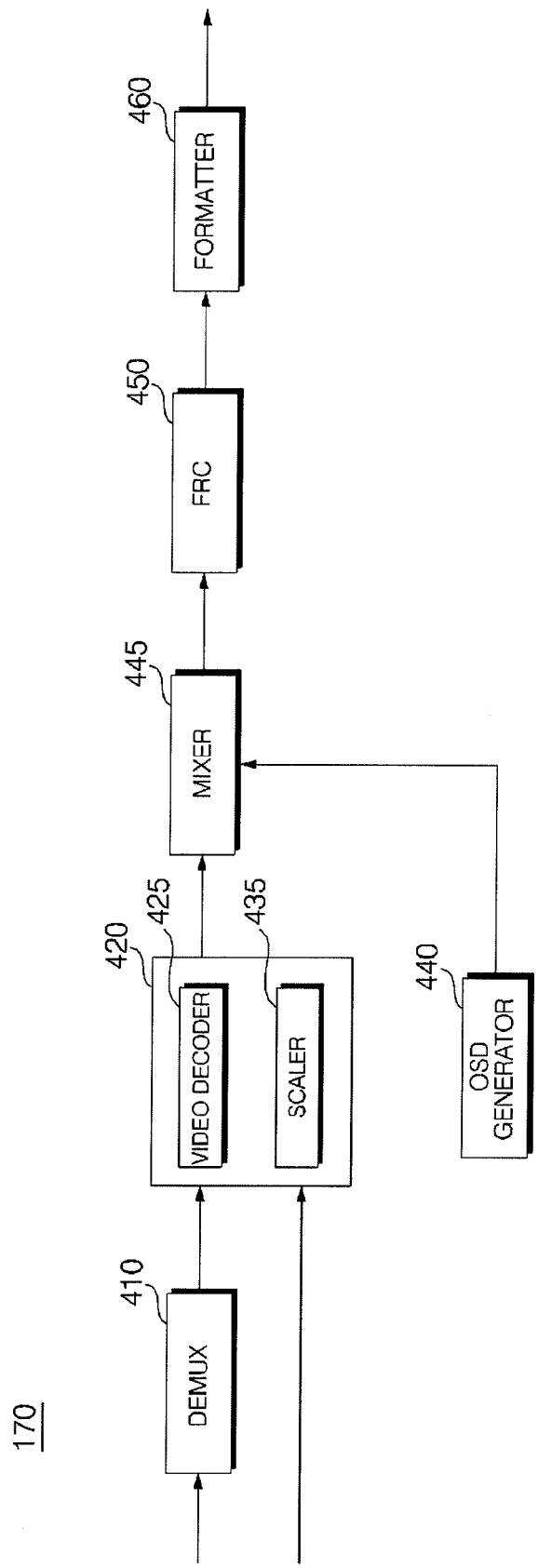
FIG. 4 is a block diagram of an example of a controller illustrated in FIG. 1.
Figure 5:
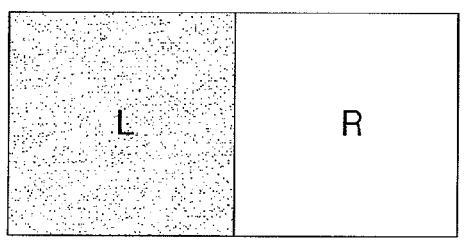
FIGS. 5(a) to 5(e) illustrate examples of three-dimensional (3D) formats according to an embodiment of the present invention.
Figure 5:
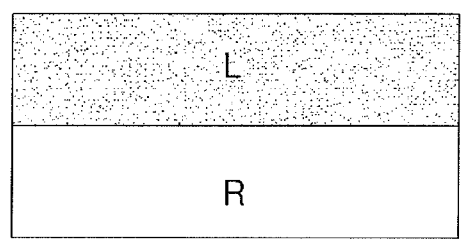
Figure 5:
Figure 5:
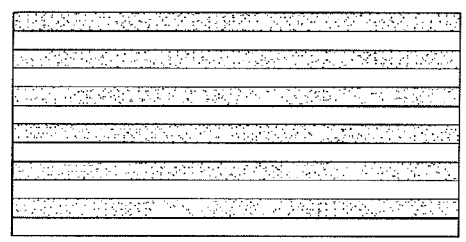
Figure 5:
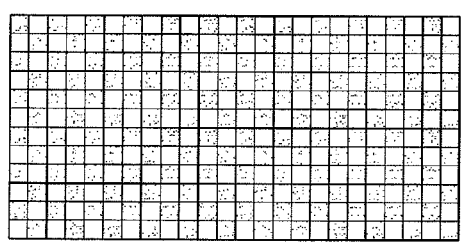
Figure 6:
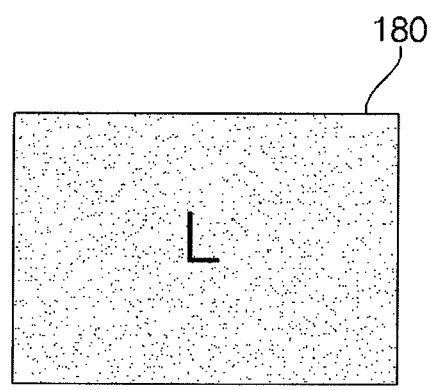
FIGS. 6(a) and 6(b) illustrate operations of shutter glasses according to a frame sequential format illustrated in FIGS. 5(a) to 5(e) according to an embodiment of the present invention.
Figure 6:
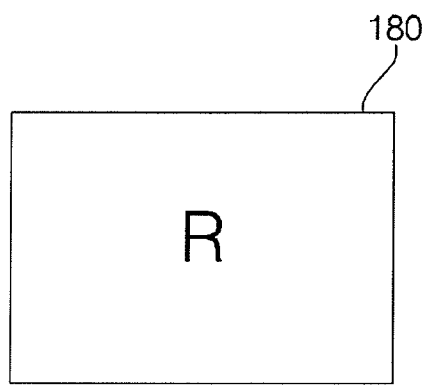
Figure 6:
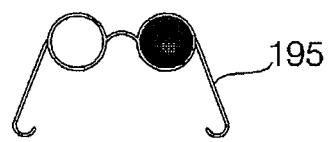
Figure 6:
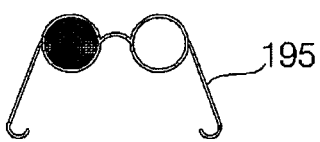

FIG. 4 is a block diagram of the controller 170 illustrated in FIG. 1, FIGS. 5(a) to 5(e) illustrate 3D formats, and FIG. 6 illustrates operations of shutter glasses according to a frame sequential format illustrated in FIG. 5(c).

Referring to FIG. 4, the controller 170 may include a DEMUX 410, a video processor 420, an OSD generator 440, a mixer 445, a Frame Rate Converter (FRC) 450, and a formatter 460 according to an embodiment of the present invention. The controller 170 may further include an audio processor and a data processor.

The DEMUX 410 demultiplexes an input stream. For example, the DEMUX 410 may demultiplex an MPEG-2 TS into a video signal, an audio signal, and a data signal. The input stream signal may be received from the tuner 110, the demodulator 120 or the external device interface 130.

The video processor 420 may process the demultiplexed video signal. For the video signal processing, the video processor 420 may include a video decoder 425 and a scaler 435. The video decoder 425 decodes the demultiplexed video signal and the scaler 435 scales the resolution of the decoded video signal so that the video signal can be displayed on the display 180.

The video decoder 425 may be provided with decoders that operate based on various standards. If the demultiplexed video signal is an MPEG-2 coded 2D video signal, the video signal may be decoded by an MPEG-2 decoder. If the demultiplexed video signal is, for example, an H.264-encoded DMB or DVB-handheld (DVB-H) signal, the video signal may be decoded by an H.264 decoder. If the video signal is an MPEC-C part 3 depth video signal, a Multi-view Video Coding (MVC) video signal, or a Free-viewpoint TV (FTV) video signal, the video signal may be decoded by an MPEC-C decoder, an MVC decoder, or an FTV decoder.

The decoded video signal processed by the video processor 420 may be a 2D video signal, a 3D video signal, or a combination of both.

The video processor 420 may determine whether the demultiplexed video signal is a 2D or 3D video signal. For example, a broadcast signal received from the tuner 110, an external signal received from an external device, or an external signal received over a network may be a 3D video signal. The video processor 420 may determine whether an input stream is a 3D video signal, referring to a 3D flag set in the header of the stream, 3D metadata of the stream, or 3D format information about the stream. And the determination that the input stream is a 3D image stream or a 2D image stream may be provided from the controller 170 to the display 180.

The decoded video signal from the video processor 420 may have any of various available formats. For example, the decoded video signal may be a 3D video signal with a color image and a depth image or a 3D video signal with multi-viewpoint image signals. The multi-viewpoint image signals may include, for example, a left-eye image signal and a right-eye image signal.

For 3D visualization, various 3D formats illustrated in FIGS. 5(a) to 5(e) are available. The 3D formats can be a side-by-side format (FIG. 5(a)), a top/down format (FIG. 5(b)), a frame sequential format (FIG. 5(c)), an interlaced format (FIG. 5(d)), and a checker box format (FIG. 5(e)). A left-eye image L and a right-eye image R are arranged side by side in the side by side format. The left-eye image L and the right-eye image R are stacked vertically in the top/down format, while they are arranged in time division in the frame sequential format. In the interlaced format, the left-eye image L and the right-eye image R alternate line by line. The left-eye image L and the right-eye image R are mixed on a box basis in the checker box format.

The OSD (On Screen Display) generator 440 generates an OSD signal autonomously or according to a user input. For example, the OSD generator 440 may generate signals by which a variety of information is displayed as graphics or text on the display 180, according to user input signals or control signals. The OSD signal may include various data such as a User Interface (UI), a variety of menus, widgets, icons, etc. Also, the OSD signal may include a 2D object and/or a 3D object. Meanwhile, the OSD generator may be called as the graphic processor which generates the OSD signal or process graphic signal or text signal.

The mixer 445 may mix the decoded video signal processed by the video processor 420 with the OSD signal generated from the OSD generator 440. The OSD signal and the decoded video signal each may include at least one of a 2D signal or a 3D signal.

The FRC 450 may change the frame rate of the mixed video signal received from the mixer 445. For example, a frame rate of 60 Hz is converted into a frame rate of 120 or 240 Hz or 480 Hz. When the frame rate is changed from 60 Hz to 120 Hz, the same first frame is inserted between a first frame and a second frame, or a third frame predicted from the first and second frames is inserted between the first and second frames. If the frame rate is changed from 60 Hz to 240 Hz, three identical frames or three predicted frames are inserted between the first and second frames.

The formatter 460 may separate a 2D video signal and a 3D video signal from the mixed video signal of the OSD signal and the decoded video signal received from the mixer 445.

Herein, a 3D video signal refers to a signal including a 3D object such as a Picture-In-Picture (PIP) image (still or moving), an EPG that describes broadcast programs, a menu, a widget, text, an object within an image, a person, a background, or a Web page (e.g. from a newspaper, a magazine, etc.).

The formatter 460 may change the format of the 3D video signal, for example, to one of the 3D formats illustrated in FIGS. 5(a) to 5(e), e.g., to the frame sequential format, herein. In that case, the left-eye image signal L and the right-eye image signal R alternate with each other in time. Accordingly, the 3D viewing device 195 illustrated in FIG. 1 is preferably shutter glasses.

FIGS. 6(a) and 6(b) illustrate an exemplary operation of the shutter glasses 195 (3D viewing device) in the frame sequential format illustrated in FIG. 5(c).

Referring to FIG. 6(a), when the left-eye image L is displayed on the display 180, the left lens is open and the right lens is shut off in the shutter glasses 195. Referring to FIG. 6(b), when the right-eye image R is displayed on the display 180, the left lens is shut off and the right lens is open in the shutter glasses 195.

Meanwhile, the formatter 460 may convert a 2D video signal to a 3D video signal. For example, the formatter 460 may detect edges or a selectable object from the 2D video signal and generate a 3D video signal with an object based on the detected edges or the selectable object. As described before, the 3D video signal may be separated into left-eye and right-eye image signals L and R.

The audio processor of the controller 170 may process the demultiplexed audio signal. For the audio signal processing, the audio processor may have a plurality of decoders. If the demultiplexed audio signal is a coded audio signal, the audio processor of the controller 170 may decode the audio signal. For example, if the demultiplexed audio signal is an MPEG-2 coded audio signal, it may be decoded by an MPEG-2 decoder. If the demultiplexed audio signal is an MPEG-4 Bit Sliced Arithmetic Coding (BSAC) coded audio signal for terrestrial DMB, it may be decoded by an MPEG-4 decoder. If the demultiplexed audio signal is an MPEG-2-Advanced Audio Coding (AAC) coded audio signal for satellite DMB or DVB-H, it may be decoded by an AAC decoder. If the demultiplexed audio signal is a Dolby AC-3 coded audio signal, it may be decoded by an AC-3 decoder.

The audio processor of the controller 170 may also adjust the bass, treble, and volume of the audio signal.

The data processor of the controller 170 may process the data signal obtained by demultiplexing the input stream signal. For example, if the data signal is a coded signal such as an EPG which includes broadcast information specifying the start time, end time, etc. of scheduled broadcast TV or radio programs, the controller 170 may decode the data signal. Examples of an EPG include ATSC-Program and System Information Protocol (PSIP) information and DVB-Service Information (SI). ATSC-PSIP information or DVB-SI information may be included in the header of a TS, i.e., a 4-byte header of an MPEG-2 TS.

While it is shown in FIG. 4 that the mixer 445 mixes signals received from the OSD generator 440 and the video processor 420 and then the formatter 460 performs 3D processing on the mixed signal, to which the present invention is not limited, the mixer 445 may be positioned after the formatter 460. Thus the formatter 460 may perform 3D processing on a signal received from the video processor 420, the OSD generator 440 may generate an OSD signal and subject the OSD signal to 3D processing, and then the mixer 445 may mix the processed 3D signals received from the formatter 460 and the OSD generator 440.

The block diagram of the image display apparatus 100 illustrated in FIG. 4 is purely exemplary. Depending upon the specifications of the image display apparatus 100 in actual implementation, the components of the image display apparatus 100 may be combined or omitted or new components may be added. That is, two or more components may be incorporated into one component or one component may be configured as separate components, as needed. For instance, the FRC 450 and the formatter 460 may be configured separately outside the controller 170.

Figure 7:
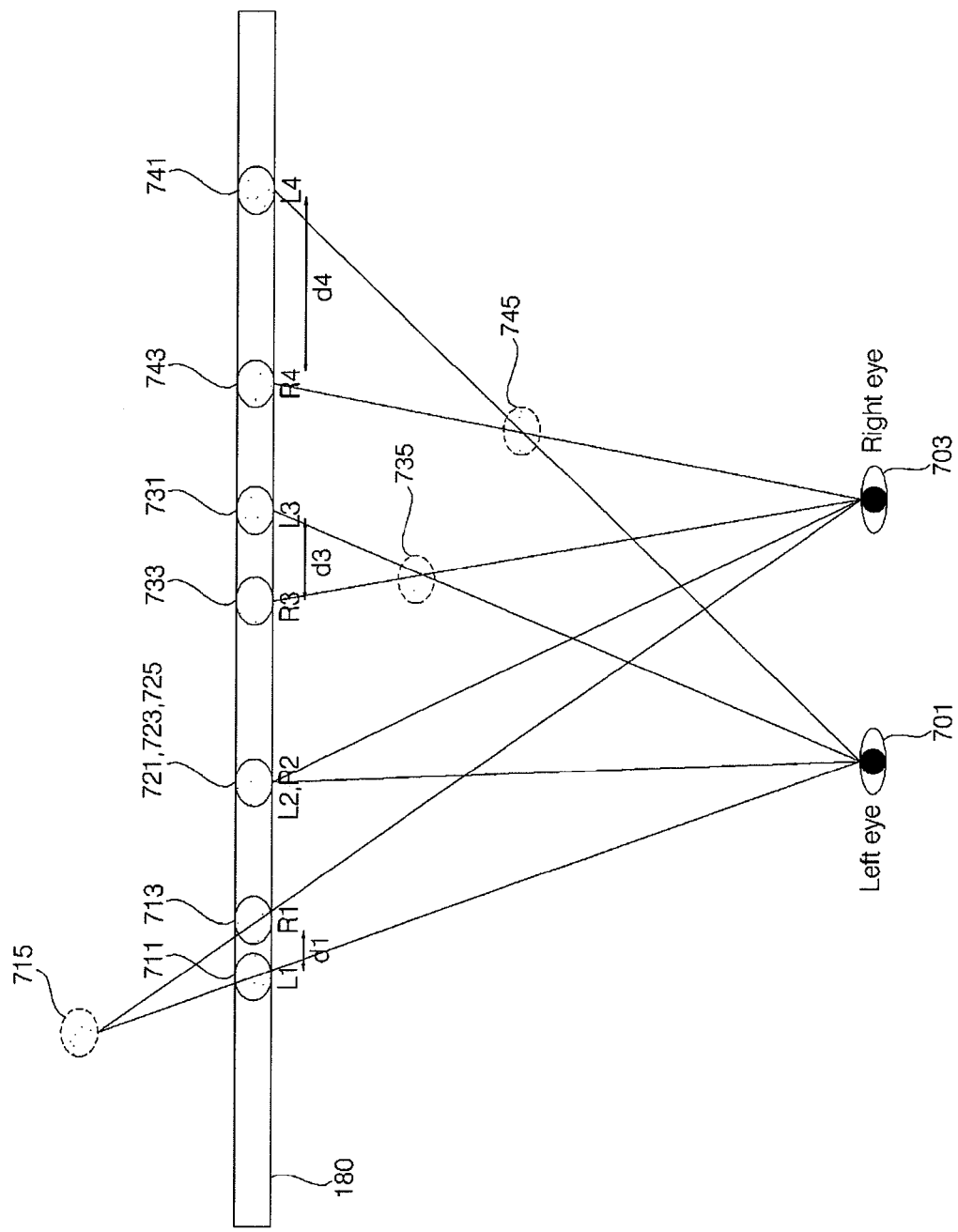
FIG. 7 illustrates formation of 3D images by combining left-eye and right-eye images according to an embodiment of the present invention.
Figure 8:
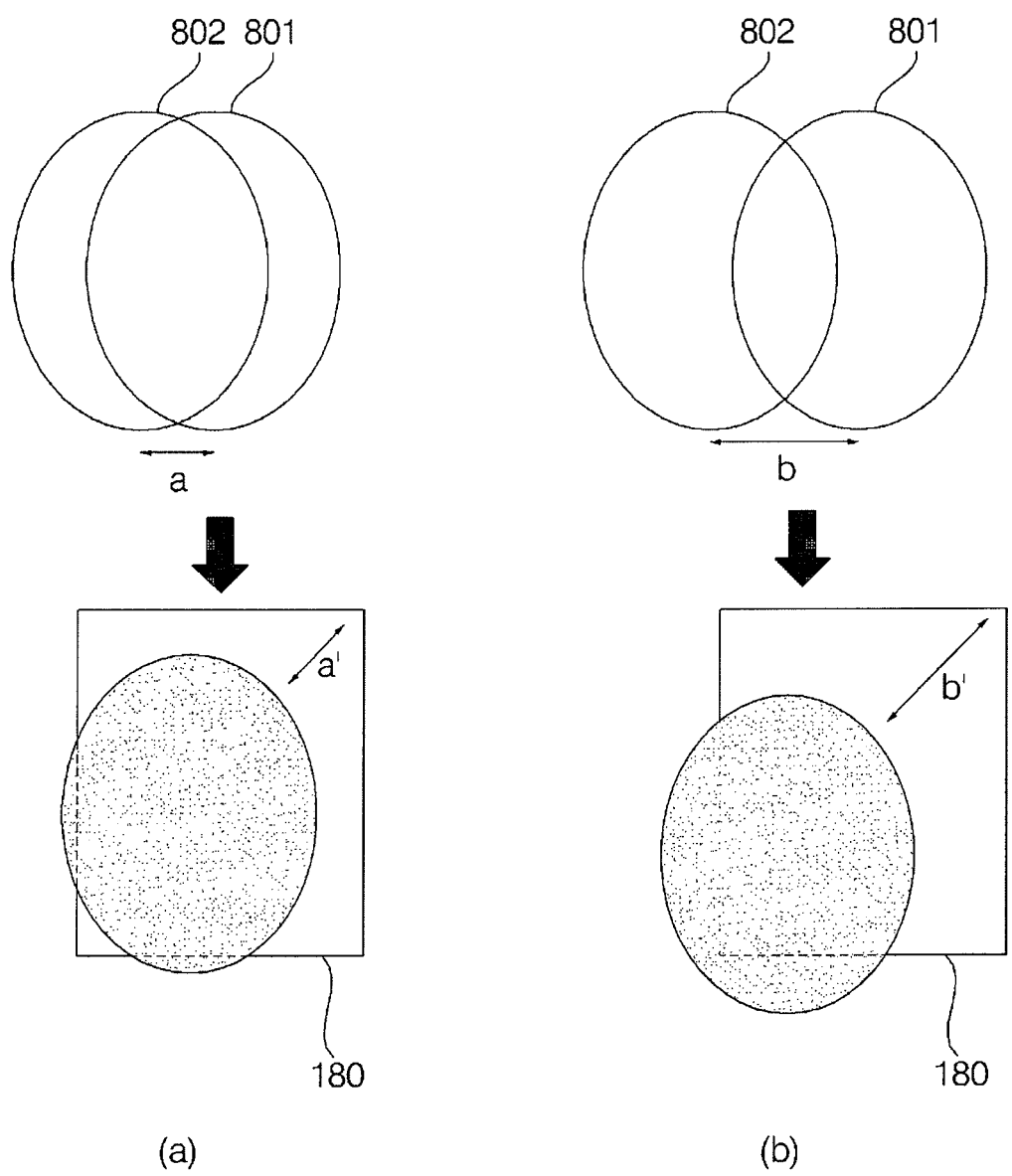
FIGS. 8(a) and 8(b) illustrate different depth illusions of 3D images according to different disparities between a left-eye image and a right-eye image according to an embodiment of the present invention.

FIG. 7 illustrates an example of a formation of 3D images by combining left-eye and right-eye images, and FIGS. 8(a) and 8(b) illustrate examples of different depth illusions according to different disparities between a left-eye image and a right-eye image, according to an embodiment of the present invention.

Referring to FIG. 7, there are a plurality of images or objects 715, 725, 735 and 745. The first object 715 is created by combining a first left-eye image 711 (L1) based on a first left-eye image signal with a first right-eye image 713 (R1) based on a first right-eye image signal, with a disparity d1 between the first left-eye and right-eye images 711 and 713. The user sees an image as formed at the intersection between a line connecting a left eye 701 of the user to the first left-eye image 711 and a line connecting a right eye 703 of the user to the first right-eye image 713. Therefore, the user is tricked into perceiving the first object 715 as behind the display 180.

As a second object 725 is created by overlapping a second left-eye image 721 (L2) with a second right-eye image 723 (R2) on the display 180, thus with a disparity of 0 between the second left-eye and right-eye images 721 and 723. Thus, the user perceives the second object 725 as on the display 180.

A third object 735 is created by combining a third left-eye image 731 (L3) with a third right-eye image 733 (R3), with a disparity d3 between the third left-eye and right-eye images 731 and 733. A fourth object 745 is created by combining a fourth left-eye image 741 (L4) with a fourth right-eye image 743 (R4), with a disparity d4 between the fourth left-eye and right-eye images 741 and 743.

The user perceives the third and fourth objects 735 and 745 at image-formed positions, that is, as being positioned in front of the display 180.

Because the disparity d4 between the fourth left-eye and right-eye images 741 and 743 is larger than the disparity d3 between the third left-eye and right-eye images 731 and 733, the fourth object 745 appears more protruding than the third object 735.

In embodiments of the present invention, the distances between the display 180 and the objects 715, 725, 735 and 745 are represented as depths. When an object is perceived to the user as being positioned behind the display 180, the depth of the object is negative-signed. On the other hand, when an object is perceived to the user as being positioned before the display 180, the depth of the object is positive-signed. Therefore, as an object appears more protruding to the user, the depth of that object is larger.

Referring to FIGS. 8(a) and 8(b), the disparity 'a' between a left-eye image 801 and a right-eye image 802 as shown in FIG. 8(a) is smaller than a disparity 'b' between the left-eye image 801 and the right-eye image 802 in FIG. 8(b). Consequently, the depth a' of a 3D object created in FIG. 8(a) is smaller than the depth b' of a 3D object created in FIG. 8(b). That is, the 3D object in FIG. 8(b) appears to be more protruding than that in FIG. 8(a).

In the case where a left-eye image and a right-eye image are combined to a 3D image, if the left-eye and right-eye images of 3D images are apart from each other by different disparities, the 3D images are perceived to the user as formed at different positions. This means that the depth of a 3D image or 3D object formed with a left-eye image and a right-eye image in combination may be controlled by adjusting the disparity of the left-eye and right-eye images.

Figure 9:
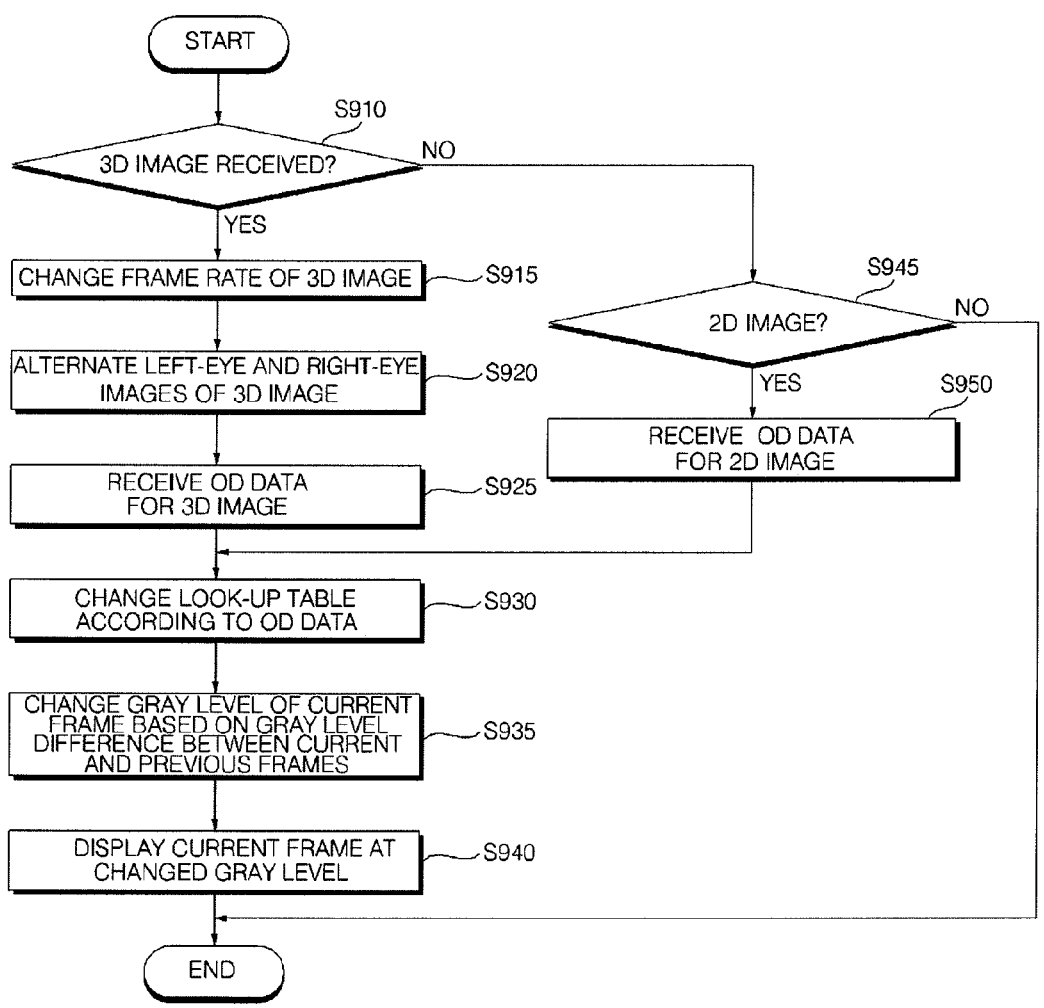
FIG. 9 is a flowchart illustrating a method for operating an image display apparatus according to an embodiment of the present invention.
Figure 11:
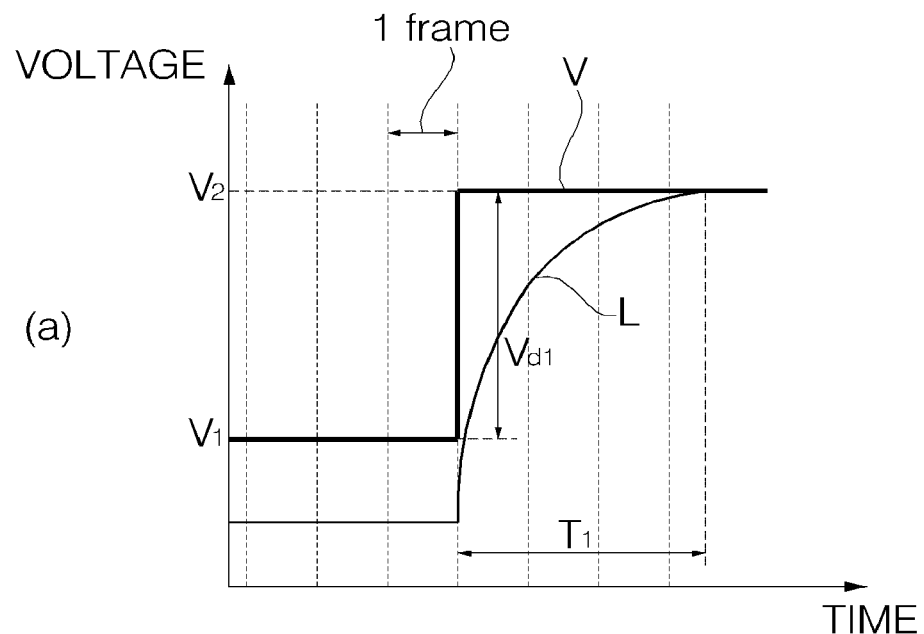
Figure 11:
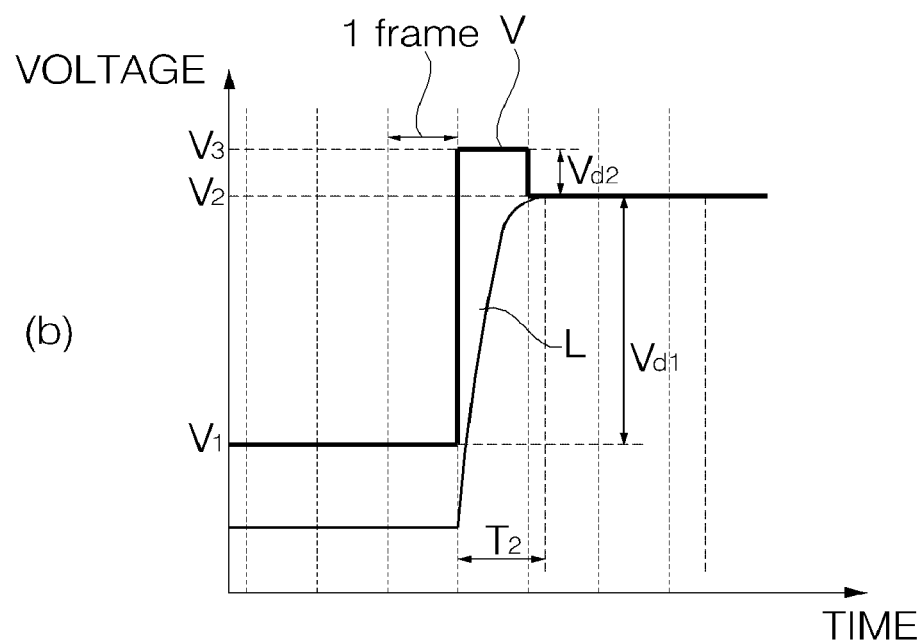
Figure 13:
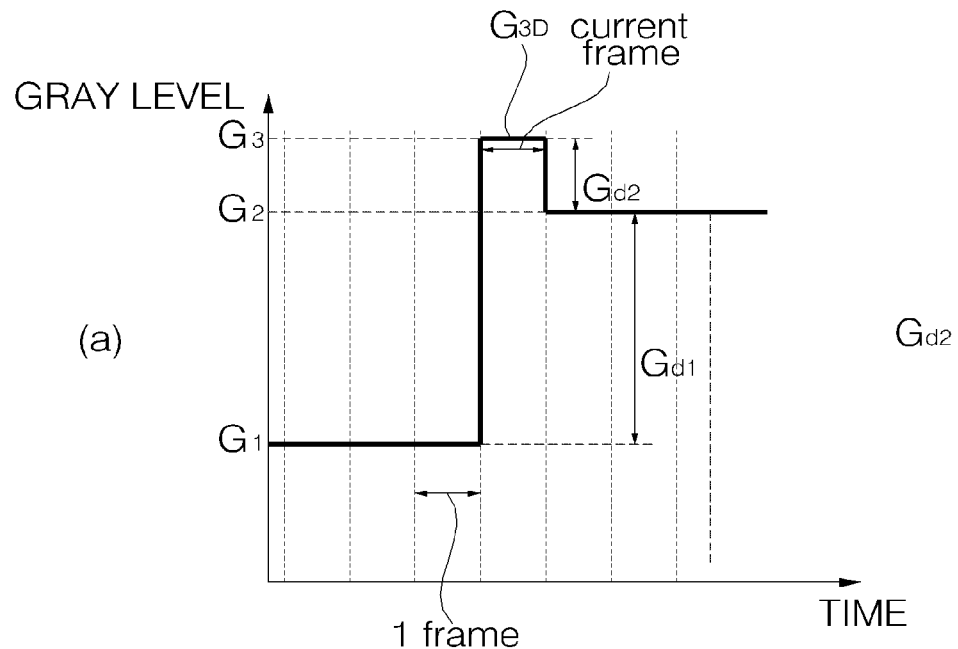
Figure 13:
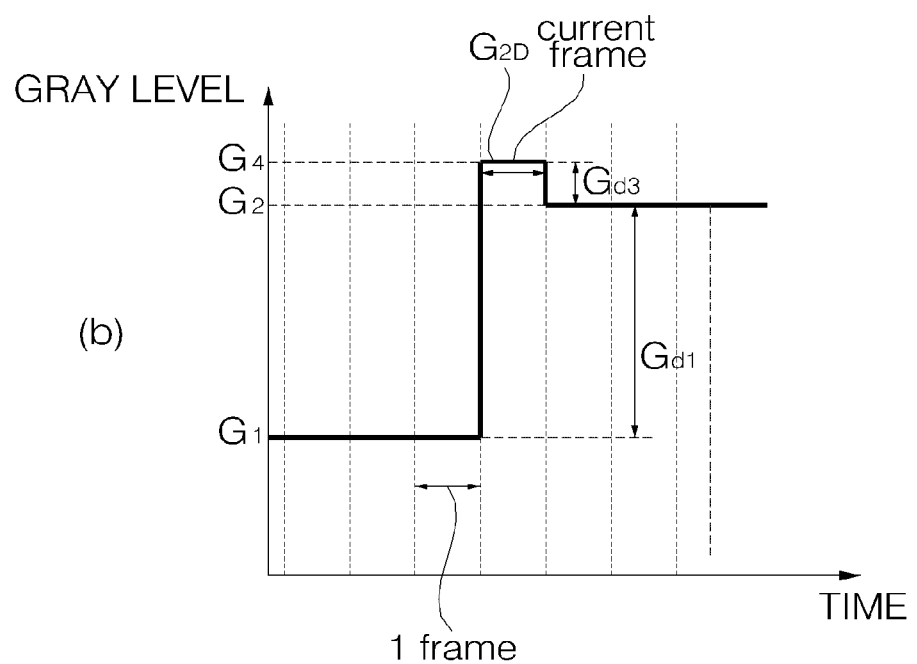
Figure 14:
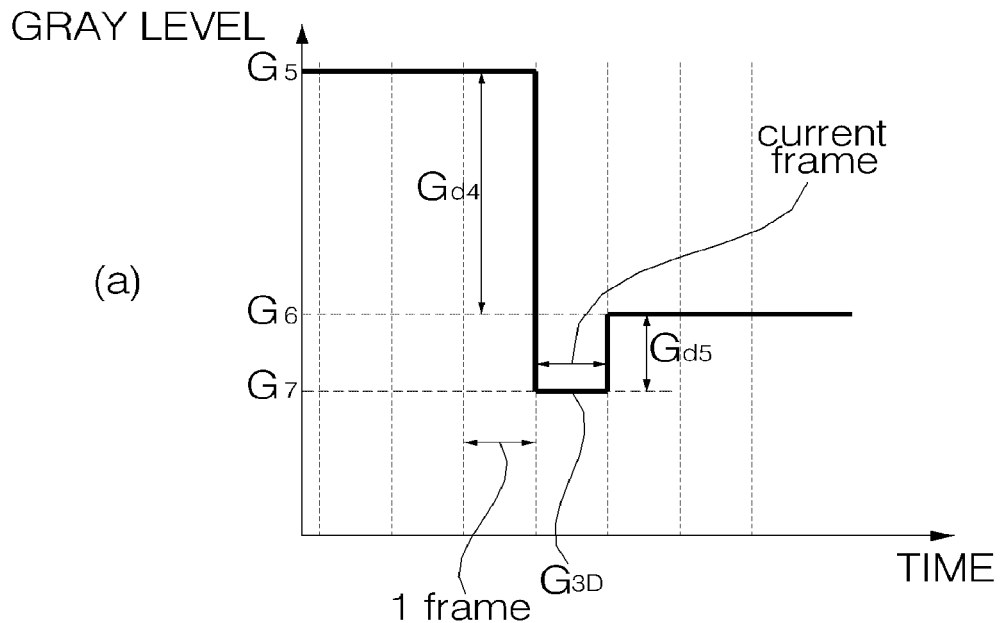
Figure 14:
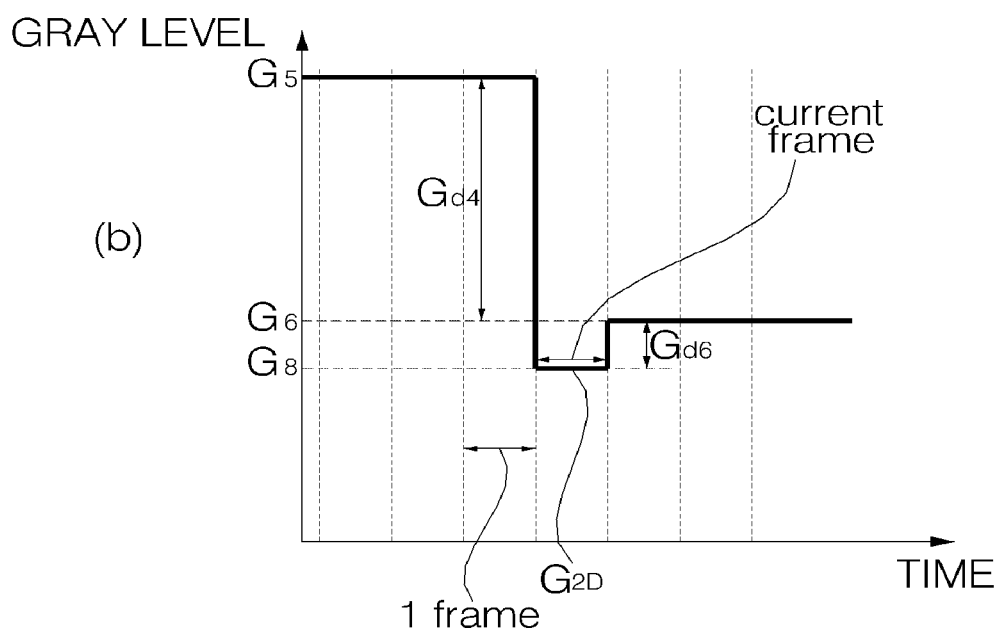
Figure 15:
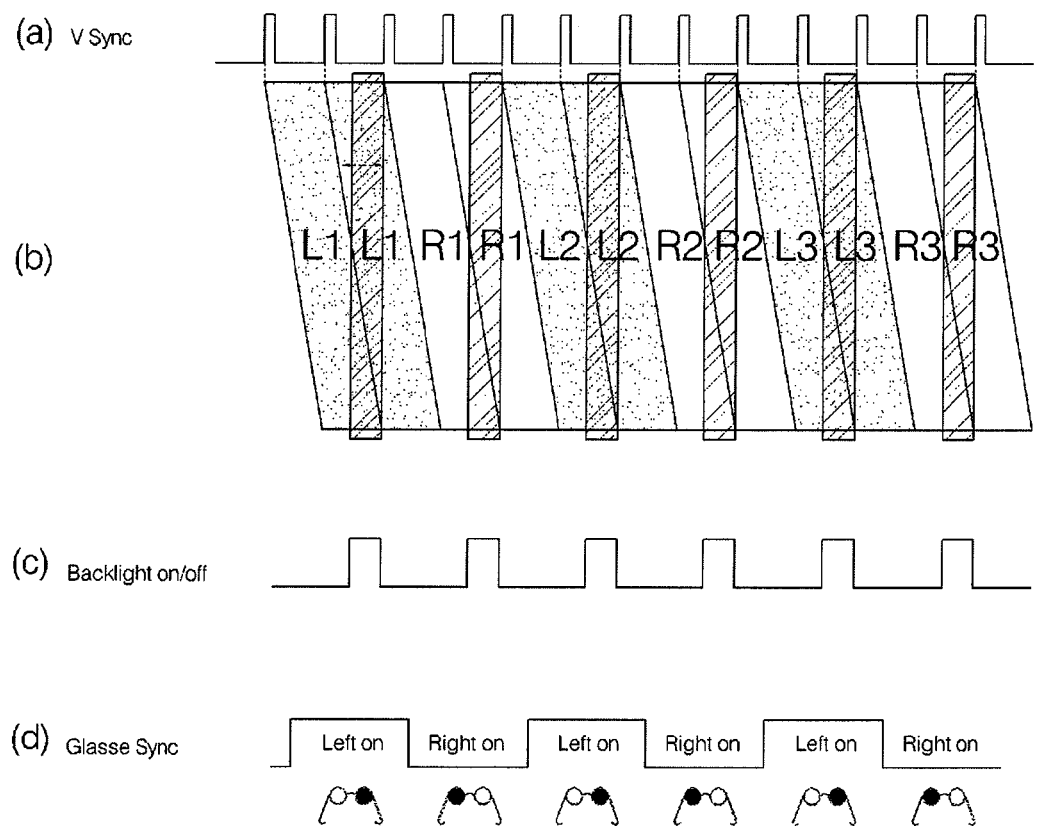

FIG. 9 is a flowchart illustrating a method for operating an image display apparatus according to an embodiment of the present invention and FIGS. 10(a) to 15(d) are views referred to for describing various examples of the method for operating an image display apparatus, illustrated in FIG. 9. The methods herein and in other examples are implemented in the image display apparatus of FIGS. 1-4 or in other suitable apparatuses.

Referring to FIG. 9, it is determined whether or not an input image is a 3D image (S910). The image may be a broadcast image based on a broadcast signal received from the tuner 110, an external image received from an external device, an image stored in the memory 140, or an image received from a content provider over a network.

The input image may be provided to the controller 170 directly or after demodulation in the demodulator 120. As stated before, the controller 170 demultiplexes and decodes the received image.

If a stream containing the image carries information or a flag indicating whether the image is a 3D image, the controller 170 may acquire the information or flag by demultiplexing or decoding the stream and determine whether the image is a 3D image based on the acquired information or flag. For instance, the controller 170 determines that the input image is a 3D image if the flag indicates so, or determines that the input image is a 2D image if the flag indicates that the image is not a 3D image.

If the received image is a multi-viewpoint image, the controller 170 may determine whether the image includes left-eye and right-eye images to thereby determine whether the image is a 3D image.

If the controller 170 determines that the input image is a 3D image, steps S915, S920 and S925 may be performed. Particularly, the frame rate of the 3D image is changed (S915) (e.g., by the FRC 45) and the left-eye image and right-eye image of the frame rate-changed 3D image are arranged alternately (S920) (e.g., by the formatter 460). Then OD data for the 3D image is received (S925). The frame rate conversion (S915) is optional. Steps S915 and S920 are explained in detail by referring to FIGS. 10(a) to 10(d).

FIG. 10(a) illustrates an example of video frames of 3D images processed by the video processor 420. It is noted from FIG. 10(a) that a 3D video frame 1010 is configured in the top/down format illustrated in FIG. 5(b). Specifically, the FRC 450 changes the frame rate of the 3D image in step S915. For example, the FRC 450 changes 60-Hz to 120 Hz or 240 Hz or 480 Hz.

FIG. 10(b) illustrates an exemplary increase of the frame rate of a 3D image in the FRC 450. The FRC 450 may increase the frame rate of the 3D image by repeating a 3D video frame 1020. The top/down format of the 3D image is still be maintained. While the frame rate is shown in FIG. 10(b) as increased four times, various settings are possible, such as doubling the frame rate. The formatter 460 arranges the left-eye and right-eye images of the 3D image alternately, e.g., in the frame sequential format (one example) illustrated in FIG. 5(c) in step S920.

FIGS. 10(c) and 10(d) illustrate exemplary conversion of the format of the frame rate-changed 3D video frame into the frame sequential format in the formatter 460.

Referring to FIG. 10(c), a first left-eye video frame L1 1030, the first left-eye video frame L1, a first right-eye video frame R1, the first right-eye video frame R1, and a second left-eye video frame L2 are sequentially arranged. For instance, identical left-eye video frames are successively arranged, followed by successive identical right-eye video frames.

Referring to FIG. 10(d), the first left-eye video frame L1 1030, a black frame 1040, the first right-eye video frame R1, a black frame, and the second left-eye video frame L2 are sequentially arranged. For instance, a black frame is inserted between the left-eye and right-eye video frames.

After the formatter 460 alternately arranges the left-eye video frames and right-eye video frames, these frames are provided to the display 180.

FIGS. 11(a) and 11(b) are views for describing an example of overdriving of the liquid crystal panel 210 of the display 180 according to an embodiment of the present invention. In view of hold-type characteristics in relation to the response speed of liquid crystals, the resulting discrepancy between display points of time on the upper and lower sides of the liquid crystal panel 210 causes crosstalk.

More specifically, FIG. 11(a) is a graph illustrating normal driving of the liquid crystal panel and FIG. 11(b) is a graph illustrating overdriving of the liquid crystal panel.

The graph of FIG. 11(a) illustrates a liquid crystal response curve L with respect to a voltage V applied to the liquid crystal panel 210. Referring to FIG. 11(a), when a first voltage $V_1$ lasts for a predetermined number of frames and then is instantly raised to a second voltage $V_2$, the liquid crystal panel is not immediately responsive to the second voltage $V_2$, thereby producing a transition period such as a first period $T_1$. As the difference Vd1 between the first voltage $V_1$ and the second voltage $V_2$ is greater, the transition period $T_1$ gets longer. Consequently, motion blurring occurs, which makes graphics blurry on the video screen. In addition, the left-eye and right-eye images of a 3D image are overlapped, that is, crosstalk is created, which is not desirable.

To prevent the motion blurring and crosstalk, the liquid crystal panel is overdriven as illustrated in FIG. 11(b) according to an embodiment of the present invention. The graph of FIG. 11(b) illustrates the liquid crystal response curve L with respect to the voltage V applied to the liquid crystal panel. Referring to FIG. 11(b), the first voltage $V_1$ is applied constantly for a predetermined number of frames and then is instantly raised to a third voltage $V_3$ higher than the second voltage $V_2$. Then the third voltage $V_3$ is dropped to the second voltage $V_2$. In this manner, the slow response speed of the liquid crystals is improved.

As noted from FIG. 11(b), the transition period is significantly shortened from the first period $T_1$ to a second period $T_2$ according to the invention. To shorten the transition period, the level of the third voltage $V_3$ is preferably higher. This means that as the difference $V_{d2}$ between the second voltage $V_2$ and the third voltage $V_3$ is greater, the transition period gets shorter.

Because a voltage is applied to the liquid crystal panel in proportion to the gray level of a frame in FIG. 11(b), the following description will be given, centering on a gray level instead of an input voltage. In an embodiment of the present invention, the gray level of a frame is changed to overdrive the liquid crystal panel, which will be described later with reference to FIGS. 12(a) and 12(b).

As mentioned before, after the left-eye and right-eye images of the 3D image are alternately arranged in step S920 of FIG. 9, the OD data for the 3D image is received (S925).

In the case of a 3D image, the controller 170 or the memory 140 may provide the OD data for the 3D image to the gray level controller 300 of the timing controller 232. As described before with reference to FIG. 3, the received OD data may be provided to the look-up table 310 of the gray level controller 300.

The look-up table 310 is changed or updated according to the received OD data (S930) and the gray level of the current frame of the input image is adjusted according to the gray level difference between the current and previous frames of the input image by referring to the updated look-up table 310 (S935). Subsequently, the current frame is displayed on the display 180 as an image at the adjusted gray level (S940).

On the other hand, if the input image is determined to be not a 3D image, the controller 170 determines whether the image is a 2D image (S945). In an example, if the input image is determined to be not a 3D image, the controller 170 may automatically determine that the input image is a 2D image. If the input image is determined to be a 2D image, the controller 170 receives OD data for the 2D image (S950) and changes/updates the look-up table according to the received OD data for the 2D image (S930). As discussed above, there are different OD data for 3D and 2D images so that the OD data for the 2D images differ from the OD data for the 3D images.

If a stream containing the image carries information or a flag indicating whether the image is a 2D image, the controller 170 may acquire the information or flag by demultiplexing or decoding the stream and determine whether the image is a 2D image based on the acquired information or flag. If determining that the input image is not a 3D image in step S910, the controller 170 may determine that the input image is a 2D image without any further operation. In that case, a separate step S945 may not be needed.

Gray levels listed in the look-up table 310 of the gray level controller 300 may be changed/updated according to the OD data received from the controller 170 or the memory 140.

The look-up table 310 stores gray levels specified by the OD data according to various gray levels of a current frame and a previous frame of an image. For example, the look-up table 310 may receive various possible gray levels for a 3D image from the controller 170 or the memory 140 and change its gray levels based on the received gray levels (S930). In addition, the look-up table 310 may receive various possible gray levels for a 2D image and may be changed according to the received gray levels (S950). The gray level data LUT set in the look-up table 310 may be provided to the gray level setter 330, for use in setting a gray level for a current frame of the input frame.

Once the controller 170 indicates to the gray level setter 330 whether the input image is a 3D image or a 2D image, the gray level setter 330 may set a gray level for the current frame frame_c using the current frame frame_c, the previous frame frame_b, and the gray level data LUT from the look-up table 310.

The gray level setter 330 may differentiate the gray level of the current frame frame_c according to whether the current frame frame_c is for a 2D image or a 3D image. For example, if the current frame frame_c is for a 3D image, the gray level of the current frame frame_c may be changed more than if it is for a 2D image.

More specifically, in one example, if the gray levels of the previous and current frames of the input image are 256 and 320, respectively, and the input image is determined to be a 2D image (e.g., by the controller 170 as discussed above), the gray level setter 330 refers to the updated LUT data of FIG. 12(a) which is for the 2D images, and sees that the gray level of the current frame may be adjusted to 393 (where gray levels 256 and 320 meet in the LUT of FIG. 12(a)). This is a gray level variation/increase of +73 for the current frame. On the other hand, if the same input image is determined to be a 3D image, then the gray level setter 330 refers to the updated LUT data of FIG. 12(b) which is for the 3D images, and sees that the gray level of the current frame may be adjusted to 399 (a gray level variation +79). Since the gray level of the 3D image is increased more than that of the 2D image according to the invention, the resulting overdriving may more effectively prevent crosstalk which occurs more often during 3D visualization.

FIG. 13(a) is a graph illustrating an exemplary gray level $G_{3D}$ of an input image during overdriving, specifically a graph illustrating a change in gray level during overdriving, when the input image is a 3D image, according to an example of the invention.

Referring to FIG. 13(a), in the case where a first gray level $G_1$ is applied for a predetermined number of frames, followed by a second gray level $G_2$ higher than the first gray level $G_1$, a third gray level $G_3$ higher than the second gray level $G_2$ may be set for overdriving before the second gray level $G_2$ is set, in such a manner that a variation $G_{d2}$ from the second gray level $G_2$ to the third gray level $G_3$ is large.

FIG. 13(b) is a graph illustrating an exemplary gray level $G_{2D}$ of an input image during overdriving, specifically a graph illustrating a change in gray level during overdriving, when the input image is a 2D image, according to an example of the invention.

Referring to FIG. 13(b), in the case where the first gray level $G_1$ is applied for a predetermined number of frames, followed by the second gray level $G_2$ higher than the first gray level $G_1$, a fourth gray level $G_4$ higher than the second gray level $G_2$ may be set for overdriving before the second gray level $G_2$ is applied. Compared to the graph of FIG. 13(a), a variation $G_{d3}$ from the second gray level $G_2$ to the fourth gray level $G_4$ (for the 2D image) is smaller than the variation $G_{d2}$ from the second gray level $G_2$ to the third gray level $G_3$ (for the 3D image).

In this manner, the gray level of a current frame is changed more when it is for a 3D image than when it is for a 2D image. Therefore, crosstalk can be prevented. As the difference GD1 between the first and second gray levels G1 and G2 is greater, the third gray level G3 of FIG. 13(a) or the fourth gray level G4 of FIG. 13(b) may be set to a larger value. Accordingly, overdriving may be applied more efficiently according to the invention.

In another example referring to FIGS. 12(a) and 12(b), if the gray levels of the previous and current frames of an input image are 320 and 256, respectively, the gray level of the current frame of the input frame may be adjusted to from 256 to 180 (a gray level variation −76, i.e. a decrement of 76) in the case of a 2D image (see FIG. 12(a)), or from 256 to 175 (a gray level variation −81, i.e. a decrement of 81) in the case of a 3D image (see FIG. 12(b)). Since the gray level of the 3D image is decreased more than that of the 2D image, the resulting overdriving may prevent crosstalk which occurs during 3D visualization, according to the present invention. As can be seen from the LUT data of FIGS. 12(a) and 12(b), the OD data correspond to increased/decreased gray level data for overdriving.

FIG. 14(a) is a graph illustrating another exemplary gray level $G_{3D}$ of an input image during overdriving, specifically a graph illustrating a change in gray level during overdriving (to be accurate, underdriving), when the input image is a 3D image.

Referring to FIG. 14(a), in the case where a fifth gray level $G_5$ is applied for a predetermined number of frames, followed by a sixth gray level $G_6$ lower than the fifth gray level $G_5$, the fifth gray level $G_5$ may be decreased to a seventh gray level $G_7$ lower than the sixth gray level $G_6$ for overdriving in such a manner that a variation $G_{d5}$ from the sixth gray level $G_6$ to the seventh gray level $G_7$ is large, before the sixth gray level $G_6$ is set.

FIG. 14(b) is a graph illustrating another exemplary gray level $G_{2D}$ of an input image during overdriving (to be accurate, underdriving), specifically a graph illustrating a change in gray level during overdriving, when the input image is a 2D image.

Referring to FIG. 14(b), in the case where the fifth gray level $G_5$ is applied for a predetermined number of frames, followed by the sixth gray level $G_6$ lower than the fifth gray level $G_5$, the fifth gray level $G_5$ may be decreased to an eighth gray level $G_8$ lower than the sixth gray level $G_6$ for overdriving for the current frame, before the sixth gray level $G_6$ is set. Compared to the graph of FIG. 14(a), a variation $G_{d6}$ from the sixth gray level $G_6$ to the eighth gray level $G_8$ (for the 2D image) is smaller than the variation $G_{d5}$ from the sixth gray level $G_6$ to the seventh gray level $G_7$ (for the 3D image). In this manner, the gray level of the current frame of the input image is changed more when it is for the 3D image than when it is for the 2D image. Therefore, crosstalk can be prevented more effective for both the 2D and 3D images.

As the difference $G_{D4}$ between the fifth and sixth gray levels $G_5$ and $G_6$ is greater, the seventh gray level $G_7$ of FIG. 14(a) or the eighth gray level $G_8$ of FIG. 14(b) may be set to a smaller value. Accordingly, more efficient overdriving (accurately, underdriving) may be achieved.

In addition, the gray level controller 300 may adjust the gray level of the current frame frame_c according to the frame rate of the current frame frame_c. For instance, as the current frame frame_c has a higher frame rate, a gray level variation may be greater for the current frame frame_c.

In step S940, the current frame with the adjusted gray level is displayed on the display panel 210. If the current frame is for a 2D image, it is displayed at the adjusted gray level. To display the 2D image, the backlight lamps 252 are turned on.

On the other hand, if the current frame is for a 3D image, the left-eye image of the current frame is displayed, followed by the right-eye image of the current frame according to the frame sequential format, at the adjusted gray level. To display the 3D image, the backlight lamps 252 are turned on in synchronization with the sequentially arranged left-eye and right-eye images. If the 3D of a different format is used, then the 3D is displayed at the adjusted gray level accordingly.

Referring to FIGS. 15(a) to 15(d), while left-eye video frames and right-eye video frames are arranged in the format illustrated in FIG. 10(c) by the formatter 460, the backlight lamps 252 are turned on in synchronization with the left-eye and right-eye video frames.

Particularly, FIG. 15(a) illustrates a vertical synchronization signal Vsync indicating the display timing of each frame. FIG. 15(b) illustrates an example of, with the left-eye and right-eye video frames input to the liquid crystal panel 210, turning on the backlight lamps 252 in synchronization with the left-eye and right-eye video frames. Referring to FIG. 15(b), the backlight lamps 252 are turned on during a part of the total length of successive left-eye video frames on the upper side of the liquid crystal panel 210 and are turned on during a part of the total length of successive right-eye video frames on the lower side of the liquid crystal panel 210. Therefore, crosstalk caused by overlapping between adjacent images, that is, the left-eye and right-eye images of the 3D image can be reduced. Further, the gray level control-based driving also contributes to crosstalk reduction.

Herein, the backlight lamps 252 are turned on simultaneously on the upper and lower sides of the liquid crystal panel 210, by way of example. Other examples or variations can also be used.

FIG. 15(c) is a diagram illustrating a backlight synchronization timing. Referring to FIG. 15(c), the backlight lamps 252 are turned on at a high level. The backlight lamps 252 described in FIGS. 15(a) to 15(d) are arranged on the upper and lower sides of the liquid crystal panel 210, e.g., in an edge type. As stated above, the backlight lamps 252 on the upper side of the liquid crystal panel 210 are turned on simultaneously with the backlight lamps 252 on the lower part of the liquid crystal panel 210.

FIG. 15(d) is a diagram illustrating an operation signal timing of the shutter glasses 195. According to the operation signal timing of the shutter glasses 195, only the left lens of the shutter glasses 195 is open when the left-eye video frames L1, L2 and L3 are displayed, and only the right lens of the shutter glasses 195 is open when the right-eye video frames R1, R2 and R3 are displayed.

Meanwhile, crosstalk can be reduced by turning on the backlight lamps 252 within each left-eye video frame and within each right-eye video frame during displaying a 3D image.

Figure 16:
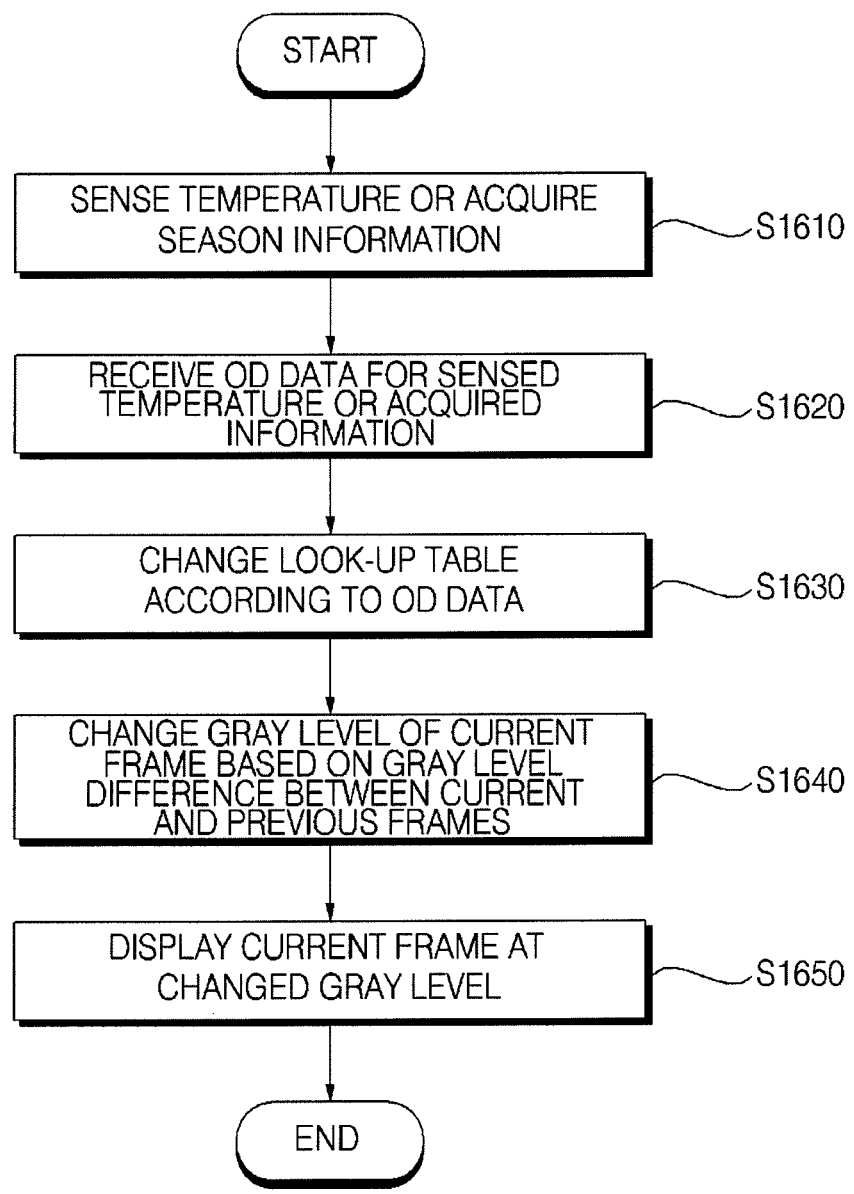
FIG. 16 is a flowchart illustrating a method for operating an image display apparatus according to an embodiment of the present invention.
Figure 17:
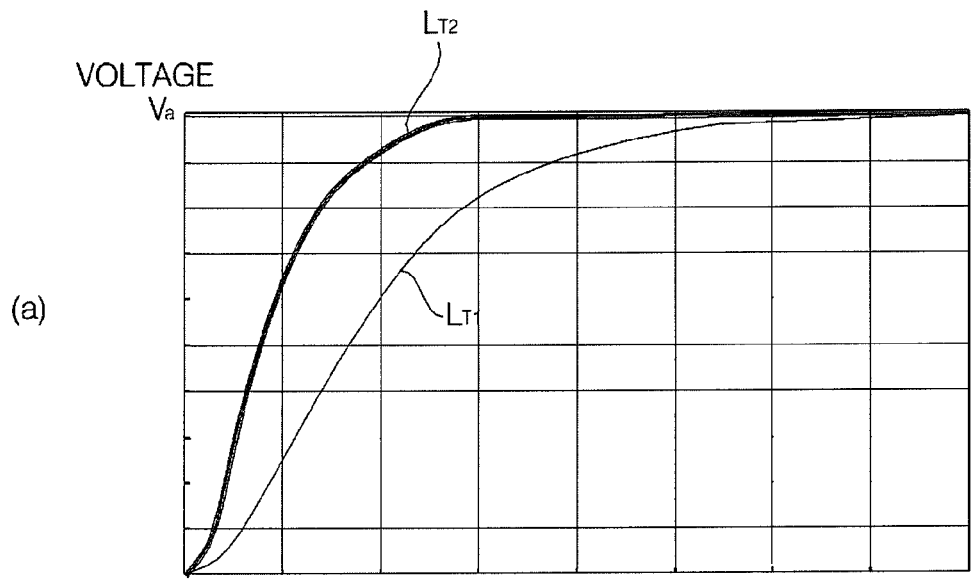
Figure 17:
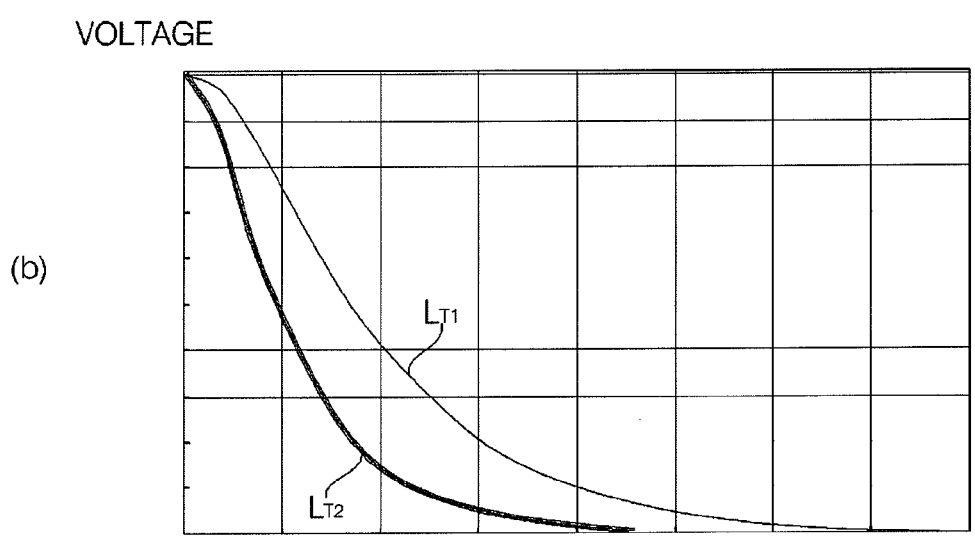
Figure 18:
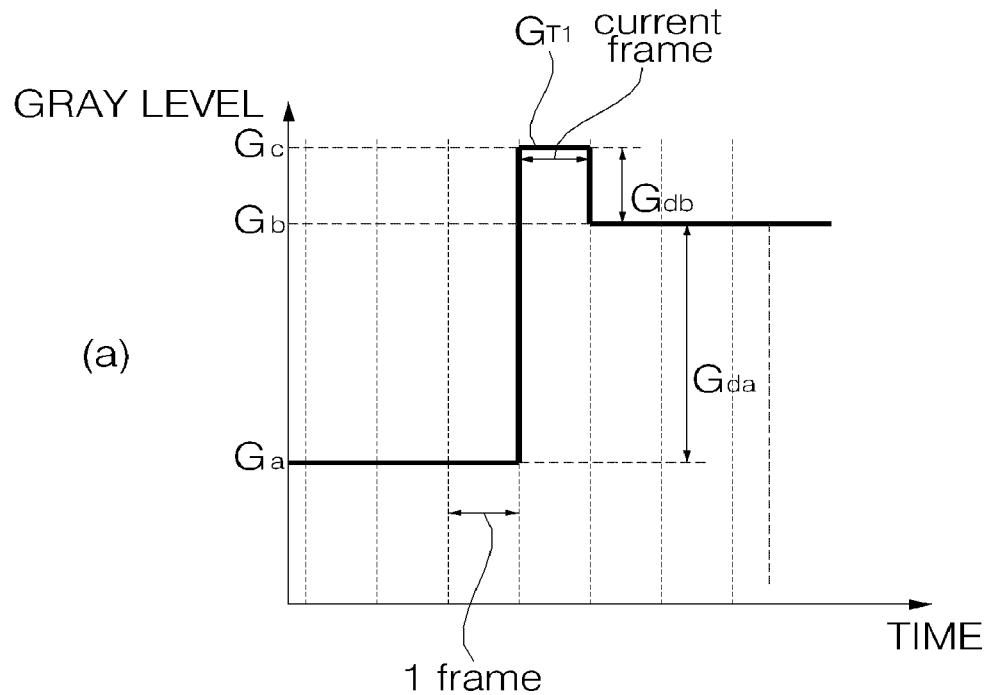
Figure 18:
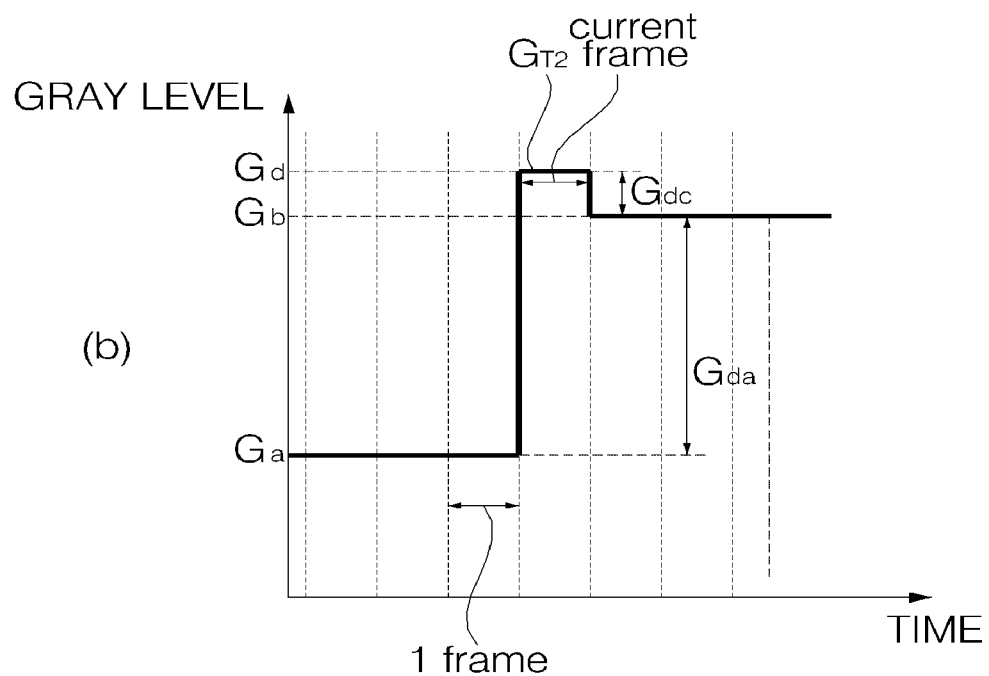
Figure 19:
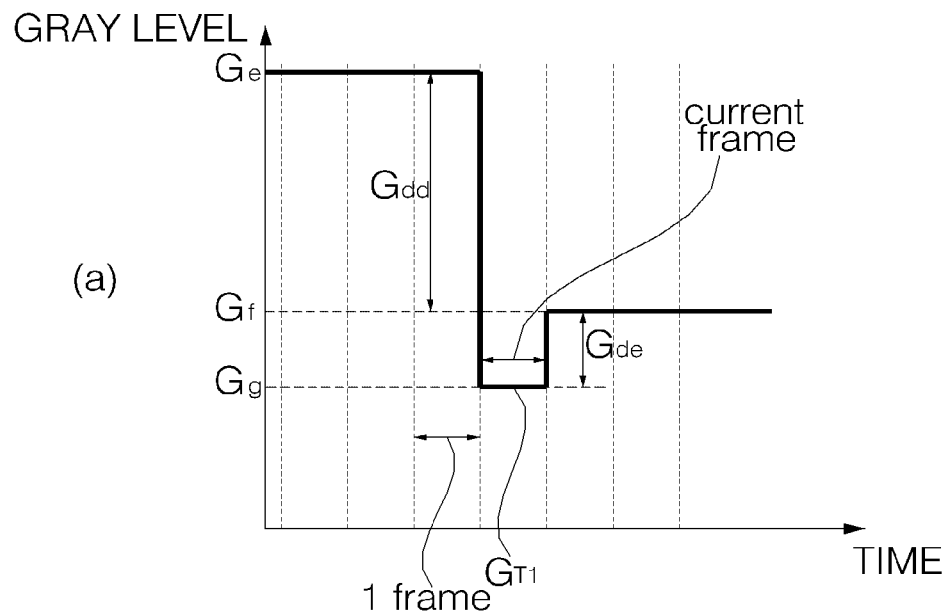
Figure 19:
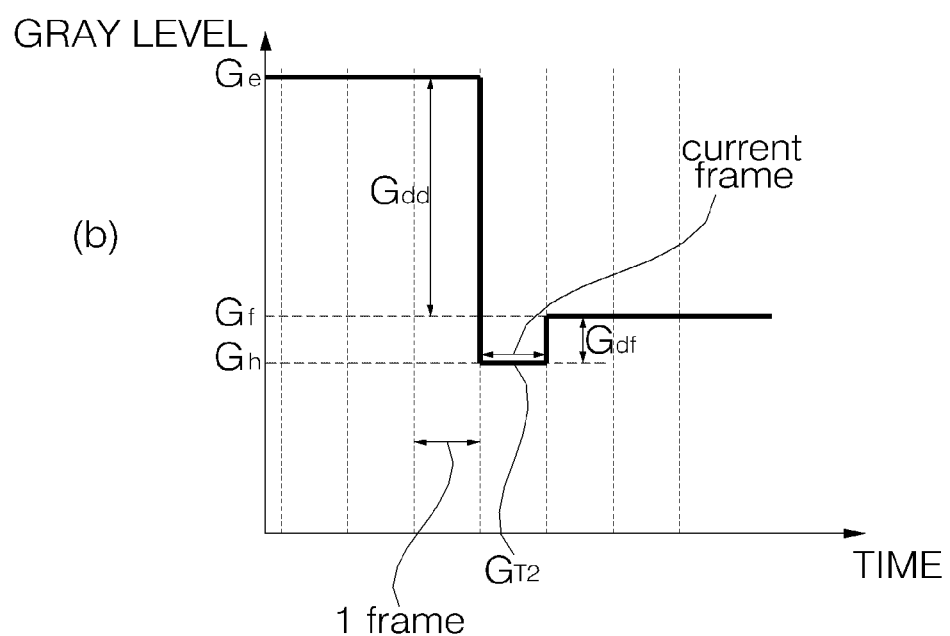
Figure 20:
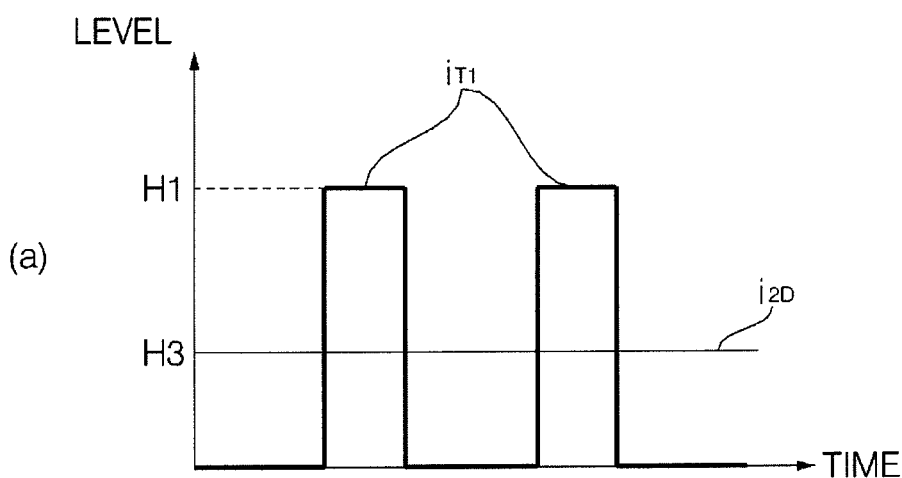
Figure 20:
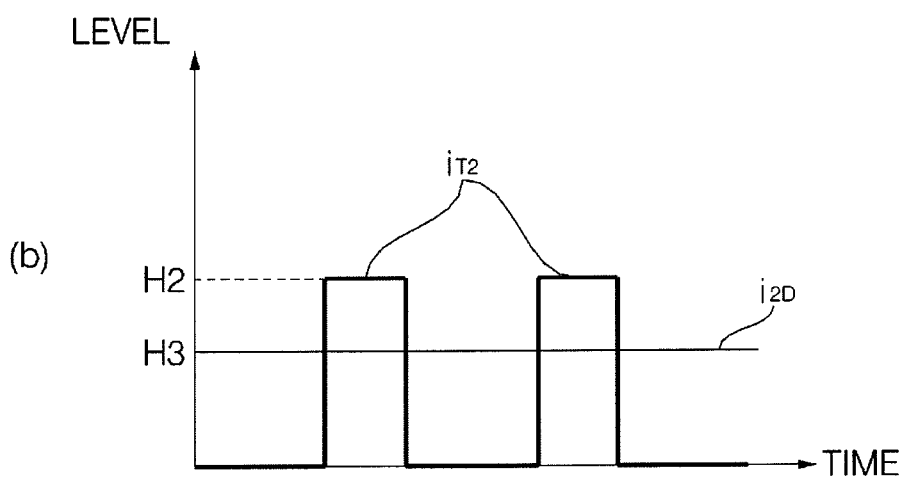

FIG. 16 is a flowchart illustrating a method for operating an image display apparatus according to an embodiment of the present invention, and FIGS. 17(a) to 20(b) are views for describing various examples of the method for operating an image display apparatus, illustrated in FIG. 16.

Referring to FIG. 16, temperature is sensed or season information is acquired (S1610). Specifically, the inner temperature or ambient temperature of the image display apparatus 100 may be sensed by the temperature sensor 270, as described with reference to FIG. 2.

The season information may be received from an external signal. For instance, the season information may be carried and included in an input stream. For instance, the season information may be acquired from a System Time Table (STT) of broadcast information, PSIP, received within a broadcast signal obtained by the tuner. As a variation, both the temperature and season information may be obtained and used.

Then OD data corresponding to the sensed temperature and/or the acquired season information is received (S1620). Gray levels listed in the look-up table 310 of the gray level controller 300 may be changed according to the OD data, particularly the OD data corresponding to the sensed temperature and/or the season information received from the controller 170 or the memory 140.

Particularly, the controller 170 or the memory 140 may provide the OD data corresponding to the sensed temperature or the season information to the look-up table 310.

The look-up table 310 is then changed/updated according to the received OD data (S1630). Here various possible OD data for various possible temperature and/or season information (e.g., season in which the image display apparatus 100 is used) are obtained and updated in the look-up table 310. For the sake of brevity, however, as only an example, the OD data chart shown in FIG. 12(a) may be the OD data chart for the temperature T2 while the OD data chart in FIG. 12(b) may be the OD data chart for the temperature T1. The gray level of current frame of the input image is then adjusted according to the difference between the gray levels of the current and previous frames of an input image (S1640). Then the current frame is displayed at the adjusted gray level (S1650).

Steps S1640 and S1650 are performed in the same or similar manner as steps S935 and S940, respectively. For example, the controller 170 or the memory 140 may provide various possible OD data corresponding to a first temperature T1 to the look-up table 310 of the gray level controller 100. Accordingly, the look-up table may be updated based on the OD data so that OD data for different combinations of gray levels of previous and current frames of an input frame for a certain room temperature (e.g., T1) may be provided. The first temperature T1 may be, for example, room temperature (about 27° C.) of a location in which the apparatus 100 is located. Similarly, the controller 170 or the memory 140 may provide OD data corresponding to a second temperature T2 to the look-up table 310 of the gray level controller 100. The second temperature T2 may be larger than the first temperature T1. Accordingly, the look-up table may be changed based on the OD data for the first and second temperatures T1 and T2. The second temperature T2 may be higher than the first temperature T1, for example, 45° C.

The gray level setter 330 may adjust the gray level of the current frame differently according to the temperature associated with the display apparatus 100. For instance, as temperature is lower, the gray level of the current frame may be changed more. In this regard, the look-up table may include various OD data for a plurality of different temperatures or for a plurality of different ranges of temperatures.

Further, as a variation, the method of FIG. 16 may be combined with the method of FIG. 9 so that the gray level of a current frame of an input image may be adjusted based on whether the input image is a 2D or 3D image and based on the temperature and/or season information.

FIGS. 17(a) and 17(b) illustrate the liquid crystal response time of the liquid crystal panel 210 with respect to an applied voltage.

Referring to FIG. 17(a), if the input voltage is raised to a predetermined voltage $V_a$, a comparison between a liquid crystal response curve $L_{T1}$ for the first temperature T1 and a liquid crystal response curve $L_{T2}$ for the second temperature T2 higher than the first temperature T1 reveals that the liquid crystal panel 210 is responsive faster at the second temperature T2 than at the first temperature T1.

Referring to FIG. 17(b), if the predetermined voltage $V_a$ is dropped, it is noted from a liquid crystal response curve $L_{T1}$ for the first temperature T1 and a liquid crystal response curve $L_{T2}$ for the second temperature T2 higher than the first temperature T1 that the liquid crystal panel 210 is responsive faster at the second temperature T2 than at the first temperature T1.

Therefore, it is preferred to change the gray level of a current frame more greatly at a lower temperature (e.g., greater gray level change for the lower ambient temperature than the higher ambient temperature or for the colder/winter season than the warmer/summer season), to thereby increase the liquid crystal response speed.

For instance, if the gray levels of previous and current frames of an input image are 64 and 256, respectively, the gray level of the current frame may be adjusted to 455 (a gray level variation of +199) when the temperature of the apparatus 100 is determined to be at the second temperature T2 (see the OD data chart for the second temperature T2 as shown in FIG. 12(a)), while the gray level of the current frame may be adjusted to 465 (a gray level variation of +209) when the temperature of the apparatus 100 is determined to be at the first temperature T1 (see the OD data chart for the first temperature T1 as shown in FIG. 12(b)). The resulting overdriving of the liquid crystal panel 210 can prevent temperature-incurred crosstalk.

FIG. 18(a) is a graph illustrating an exemplary gray level $G_{T1}$ of an input image during overdriving, specifically a graph illustrating a change in gray level during overdriving at the first temperature T1, according to an example of the invention.

Referring to FIG. 18(a), when the temperature (e.g., ambient temperature) of the apparatus 100 is determined to at the first temperature T1 and in the case where a first gray level $G_a$ is applied for a predetermined number of frames, followed by a second gray level $G_b$ higher than the first gray level $G_a$, a third gray level $G_c$ higher than the second gray level $G_b$ may be set for overdriving before the second gray level $G_b$ is applied in such a manner that a variation $G_{db}$ from the second gray level $G_b$ to the third gray level $G_c$ is large.

FIG. 18(b) is a graph illustrating another exemplary gray level $G_{T2}$ of an input image during overdriving, specifically a graph illustrating a change in gray level during overdriving at the second temperature T2 higher than the first temperature T1.

Referring to FIG. 18(b), when the temperature (e.g., ambient temperature) of the apparatus 100 is determined to at the second temperature T2 higher than the first temperature T1 and in the case where the first gray level $G_a$ is applied for a predetermined number of frames, followed by the second gray level $G_b$ higher than the first gray level $G_1$, a fourth gray level $G_d$ higher than the second gray level $G_b$ may be set for overdriving before the second gray level $G_b$ may be set. Compared to the graph of FIG. 18(a), a variation $G_{dc}$ from the second gray level $G_b$ to the fourth gray level $G_d$ is smaller than the variation $G_{db}$ from the second gray level $G_b$ to the third gray level $G_c$.

As in this manner, since the gray level variation of a current frame increases with lower temperature, crosstalk can be prevented effectively.

As the difference $G_{da}$ between the first and second gray levels $G_a$ and $G_b$ is larger, the third gray level $G_c$ of FIG. 18(a) or the fourth gray level $G_c$ of FIG. 18(b) may be set to a larger value. Accordingly, overdriving may be more efficiently applied.

In another example, if the gray levels of the previous and current frames of an input frame are 448 and 256, respectively, the gray level of the current frame may be adjusted to 60 (a gray level variation −196, i.e. a decrement of 196) when the temperature of the apparatus 100 is determined to be at the second temperature T2 (see FIG. 12(a)) and to 50 (a gray level variation −206, i.e. a decrement of 206) when the temperature of the apparatus 100 is determined to be at the first temperature T1 lower than the second temperature T2 (see FIG. 12(b)). Since the gray level of a 3D image is decreased more at a lower temperature, the resulting overdriving may prevent temperature-incurred crosstalk.

FIG. 19(a) is a graph illustrating an exemplary gray level $G_{T1}$ of an input image during overdriving, specifically a graph illustrating a change in gray level during overdriving (to be accurate, underdriving) when the temperature of the apparatus is at the first temperature T1.

Referring to FIG. 19(a), in the case where a fifth gray level $G_e$ is applied for a predetermined number of frames, followed by a sixth gray level $G_f$ lower than the fifth gray level $G_e$, the fifth gray level $G_e$ may be decreased to a seventh gray level $G_g$ lower than the sixth gray level $G_f$ for overdriving in such a manner that a variation $G_{de}$ from the sixth gray level $G_f$ to the seventh gray level $G_g$ is large, before the sixth gray level $G_f$ is set.

FIG. 19(b) is a graph illustrating another exemplary gray level $G_{T2}$ of an input image during overdriving (to be accurate, underdriving), specifically a graph illustrating a change in gray level during overdriving when the temperature of the apparatus 100 is determined to be at the second temperature T2 higher than the first temperature T1.

Referring to FIG. 19(b), in the case where the fifth gray level $G_e$ is applied for a predetermined number of frames, followed by the sixth gray level $G_f$ lower than the fifth gray level $G_e$, the fifth gray level $G_e$ may be decreased to an eighth gray level $G_h$ lower than the sixth gray level $G_f$ for overdriving, before the sixth gray level $G_f$ is set. Compared to the graph of FIG. 19(a), a variation $G_{df}$ from the sixth gray level $G_f$ to the eighth gray level $G_h$ is smaller than the variation $G_{de}$ from the sixth gray level $G_f$ to the seventh gray level $G_g$. In this manner, the gray level of a current frame is changed more at a lower temperature. Therefore, crosstalk can be prevented.

As the difference $G_{dd}$ between the fifth and sixth gray levels $G_e$ and $G_f$ is wider, the seventh gray level $G_g$ of FIG. 19(a) or the eighth gray level $G_h$ of FIG. 19(b) may be set to a smaller value. Accordingly, overdriving (accurately, underdriving) may be more efficiently according to the present invention.

FIGS. 20(a) and 20(b) illustrate electric current levels at different temperatures for the light sources 252.

It is noted from FIGS. 20(a) and 20(b) that the level of current per frame flowing through the backlight lamps 252 is higher at the first temperature T1 than at the second temperature T2 higher than the first temperature T1. Therefore, the liquid crystal response speed can be increased, as described before with reference to FIG. 17.

Referring to FIGS. 20(a) and 20(b), the level H1 of an instantaneous current $i_{T1}$ flowing through the backlight lamps 252 at the first temperature T1 is set to be higher than the level H2 of an instantaneous current $i_{T2}$ flowing through the backlight lamps 252 at the second temperature T2.

Meanwhile, the level of current $i_{T1}$ or $i_{T2}$ per frame flowing through the backlight lamps 252 for 3D imaging may be higher than the level of current $i_2D$ per frame flowing through the backlight lamps 252 for 2D imaging. As a consequence, luminance can be improved during a display of a 3D image.

According to the various embodiments and examples of the invention, crosstalk can be reduced during a display of an image by adaptively changing the gray level of a current frame of an input image signal according to whether the current frame is of a 2D image or a 3D image. Especially, the adaptive gray level adjustment is performed through overdriving, thereby preventing blurring.

A look-up table is changed or updated according to received OD data, for use in adjusting a gray level. The look-up table may be updated on a regular basis, or based on the input image, or as needed. Thus, there is no need for using an additional look-up table.

In addition to or in the alternative to the use of the 3D or 2D image criteria, the gray level of the current frame can also be adjusted according to the inner temperature or ambient temperature of an image display apparatus, and/or according to the season information as needed. For instance, the gray level of the current frame can be adjusted according to the season information carried in broadcast information of a received stream.

If the image display apparatus employs a hold-type liquid crystal panel, the frame rate of a 3D image is increased and the left-eye and right-eye images of the 3D image are alternately arranged. Therefore, crosstalk can be reduced.

The image display apparatus and the method for operating the same according to the foregoing embodiments are not restricted to the embodiments set forth herein. Therefore, variations and combinations of the exemplary embodiments set forth herein may fall within the scope of the present invention.

The method for operating an image display apparatus according to the foregoing embodiments may be implemented as code that can be written to a computer-readable recording medium and can thus be read by a processor. The computer-readable recording medium may be any type of recording device in which data can be stored in a computer-readable manner. Examples of the computer-readable recording medium include a ROM, a RAM, a CD-ROM, a magnetic tape, a floppy disc, an optical data storage, and a carrier wave (e.g., data transmission through the Internet). The computer-readable recording medium can be distributed over a plurality of computer systems connected to a network so that computer-readable code is written thereto and executed therefrom in a decentralized manner. Functional programs, code, and code segments needed for realizing the embodiments herein can be construed by one of ordinary skill in the art.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A method for operating an image display apparatus including a display unit, comprising:
   determining whether an input image is a two-dimensional (2D) image or a three-dimensional (3D) image;
   obtaining season information;
   changing, by the image display apparatus, a gray level of a current frame of the input image based on the determination result and based on a difference between the gray level of the current frame and a gray level of a previous frame of the input image, and the season information; and
   displaying, on the display unit, an image corresponding to the current frame at the changed gray level,
   wherein when the input image is the 3D image, a frame rate of the 3D image is more increased than a frame rate of the 2D image,
   wherein as a frame rate of the current frame of the image increases, the gray level of the current frame increases, and
   wherein the season information is acquired from a System Time Table (STT) of broadcast information within a broadcast signal obtained by a tuner.

2. The method according to claim 1, further comprising:
   storing a look-up table including a plurality of different amounts of gray level change for the current frame for when the input image is the 2D image and for when the input image is the three-dimensional image,
   wherein the changing step changes the gray level of the current frame by using the stored look-up table.

3. The method according to claim 2, further comprising:
   receiving over drive data for when the image is the 3D image; and
   updating the look-up table based on the over drive data.

4. The method according to claim 1, wherein when the determining step determines that the input image is the 3D image, the changing step changes the gray level of the current frame more than when the input image is the 2D image.

5. The method according to claim 1, further comprising:
   obtaining temperature information; and
   changing, by the image display apparatus, the gray level of the current frame of the input image according to a difference between the gray level of the current frame and the gray level of the previous frame of the input image and according the temperature information.

6. The method according to claim 5, wherein the changing step changes the gray level of the current frame differently depending the temperature information.

7. The method according to claim 5, wherein the changing step changes the gray level of the current frame more, when the temperature information indicates an ambient temperature associated with the image display apparatus to be lower.

8. The method according to claim 5, wherein the obtaining step obtains the temperature information from an external signal received by the image display apparatus.

9. The method according to claim 5, further comprising:
   storing a look-up table including a plurality of different amounts of gray level change for the current frame according to the temperature information or the season information,
   wherein the changing step changes the gray level of the current frame by using the look-up table.

10. The method according to claim 5, wherein the changing step changes the gray level of the current frame by changing a level of current per frame flowing through a backlight unit of the image display apparatus according to the temperature information or the season information.

11. The method according to claim 1, wherein the level of current per frame flowing through the backlight lamps increases as an ambient temperature associated with the image display apparatus increases.

12. The method according to claim 1,
    wherein successive left-eye video frames and successive right-eye video frames of the 3D image having a changed frame rate are arranged alternately,
    wherein backlight lamps of the image display apparatus are turned on during a part of a total length of successive left-eye video frames and during a part of a total length of successive right-eye video frames, and
    wherein a turn-on period in a first left-eye video frame of the successive left-eye video frames and a turn-on period in a second left-eye video frame of the successive left-eye frames are overlapped.

13. An image display apparatus comprising:
    a tuner;
    a controller configured to determine whether an input image is a 2D image or a 3D image;
    a frame rate converter configured to, when the controller determines that the input image is the 3D image, increase a frame rate of the 3D image;
    a gray level processor configured to change a gray level of a current frame of the input image based on the determination result and based on a difference between the gray level of the current frame and a gray level of a previous frame of the input image, and season information; and
    a display unit configured to display an image corresponding to the current frame at the changed gray level,
    wherein the display unit includes backlight lamps and a liquid crystal panel,
    wherein when the input image is the 3D image, the frame rate of the three-dimensional image is more increased than a frame rate of the 2D image,
    wherein as a frame rate of the current frame of the image increases, the gray level of the current frame increases, and
    wherein the season information is acquired from a System Time Table (STT) of broadcast information within a broadcast signal obtained by the tuner.

14. The image display apparatus according to claim 13, wherein the gray level processor changes the gray level of the current frame differently depending on whether the input image is the 2D image or the 3D image.

15. The image display apparatus according to claim 13, further comprising:
    a storage unit configured to store a look-up table including a plurality of different amounts of gray level change for the current frame for when the input image is the 2D image and for when the input image is the 3D image,
    wherein the gray level processor changes the gray level of the current frame by using the stored look-up table.

16. The image display apparatus according to claim 13, further comprising:
    a formatter configured to, when the controller determines that the input image is a 3D image, alternately arrange the successive left-eye video frames and the successive right-eye video frames of the 3D image having a changed frame rate.

17. The image display apparatus according to claim 13, wherein the display unit includes:
    a first substrate;
    a second substrate;

a liquid crystal layer between the first and second substrates;
a plurality of gate lines and a plurality of data lines on the first substrate;
a gate driver configured to control the gate lines;
a data driver configured to control the data lines; and
a thermistor in a bias voltage generator that generates a turn-on voltage for a gate end of the gate driver,
wherein the temperature of the liquid crystal panel is sensed by the thermistor, and
wherein the gray level processor changes the gray level of the current frame differently according to the temperature information.

18. The image display apparatus according to claim 17, wherein the gray level processor changes the gray level of the current frame by changing a level of current per frame flowing through the backlight unit according to the temperature information or the season information.

19. The image display apparatus according to claim 13, wherein the level of current per frame flowing through the backlight lamps increases as an ambient temperature associated with the image display apparatus increases.

20. The image display apparatus according to claim 13,
wherein successive left-eye video frames and successive right-eye video frames of the three-dimensional image having a changed frame rate are arranged alternately,
wherein backlight lamps of the image display apparatus are turned on during a part of a total length of successive left-eye video frames and during a part of a total length of successive right-eye video frames, and
wherein a turn-on period in a first left-eye video frame of the successive left-eye video frames and a turn-on period in a second left-eye video frame of the successive left-eye frames are overlapped.

* * * * *